US011235452B2

(12) United States Patent
Kaye, Jr. et al.

(10) Patent No.: US 11,235,452 B2
(45) Date of Patent: Feb. 1, 2022

(54) ACCESSORIES FOR OSCILLATING POWER TOOLS

(71) Applicant: Black & Decker Inc., New Britain, CT (US)

(72) Inventors: Thomas R. Kaye, Jr., Fallston, MD (US); James R. Niblett, Columbia, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/009,427

(22) Filed: Sep. 1, 2020

(65) Prior Publication Data
US 2020/0398415 A1   Dec. 24, 2020

Related U.S. Application Data

(63) Continuation of application No. 16/278,423, filed on Feb. 18, 2019, now Pat. No. 10,792,801, which is a
(Continued)

(51) Int. Cl.
*B25F 3/00* (2006.01)
*B23B 31/10* (2006.01)
(Continued)

(52) U.S. Cl.
CPC ............... *B25F 3/00* (2013.01); *B23B 31/10* (2013.01); *B23B 31/19* (2013.01); *B24B 23/005* (2013.01);
(Continued)

(58) Field of Classification Search
CPC ......... B23B 31/10; B23B 31/19; B24B 23/04; B24B 23/005; B27B 5/30; B27B 19/006; B25F 3/00
See application file for complete search history.

(56) References Cited

U.S. PATENT DOCUMENTS

| 694,597 A | 3/1902 | Wood |
| 2,305,465 A | 12/1942 | Bangser |

(Continued)

FOREIGN PATENT DOCUMENTS

| AU | 2006305634 | 4/2007 |
| CH | 657411 A5 | 8/1986 |

(Continued)

OTHER PUBLICATIONS

Zimmer Inc., Brochure "Air Drive Blades—The Next Generation" dated Jun. 28, 1993, 1 page; © 1993 Zimmer, Inc.
(Continued)

*Primary Examiner* — Eric A. Gates
(74) *Attorney, Agent, or Firm* — Scott B. Markow

(57) ABSTRACT

An accessory for coupling to an attachment mechanism of an oscillating power tool includes a working end, an opposite rear end, and a fitment portion adjacent the rear end portion. The fitment portion includes a central opening having a central portion and a rearward portion open to the rear end, and configured to receive a post of a tool clamping mechanism. The fitment portion further includes a first plurality of openings in communication with and extending radially outward from the central portion, a second plurality of openings not in communication with and positioned radially outward from the central portion. The central portion, the first plurality of openings, and the second plurality of openings are configured to couple the fitment portion to a plurality of different configurations of attachment mechanisms for oscillating power tools.

20 Claims, 19 Drawing Sheets

Related U.S. Application Data continuation of application No. 16/026,408, filed on Jul. 3, 2018, now Pat. No. 10,245,716, which is a continuation of application No. 14/968,973, filed on Dec. 15, 2015, now Pat. No. 10,040,186, which is a continuation of application No. 13/781,900, filed on Mar. 1, 2013, now Pat. No. 9,242,361, which is a continuation-in-part of application No. 13/385,614, filed on Jul. 16, 2012, now Pat. No. 9,073,195.

(51) Int. Cl.
*B27B 5/30* (2006.01)
*B24B 23/04* (2006.01)
*B27B 19/00* (2006.01)
*B24B 23/00* (2006.01)
*B23B 31/19* (2006.01)
*B27B 5/32* (2006.01)
*B23D 61/00* (2006.01)
*B25F 5/00* (2006.01)

(52) U.S. Cl.
CPC ............... *B24B 23/04* (2013.01); *B27B 5/30* (2013.01); *B27B 19/006* (2013.01); *B23D 61/006* (2013.01); *B25F 5/00* (2013.01); *B27B 5/32* (2013.01); *Y10T 83/7045* (2015.04); *Y10T 83/9319* (2015.04); *Y10T 83/9457* (2015.04); *Y10T 279/33* (2015.01); *Y10T 279/3406* (2015.01); *Y10T 403/7062* (2015.01)

(56) References Cited

U.S. PATENT DOCUMENTS

| | | |
|---|---|---|
| D137,633 S | 4/1944 | Jacobsen |
| 2,682,184 A | 6/1954 | Szarkowski |
| 2,693,365 A | 11/1954 | Zelewsky |
| 2,766,791 A | 10/1956 | Givens |
| 2,785,515 A | 3/1957 | Sansig |
| 2,997,819 A | 8/1961 | Schact |
| 3,055,497 A | 9/1962 | Klonski |
| 3,433,082 A | 3/1969 | Bitter et al. |
| 3,436,875 A | 4/1969 | Cheney |
| 3,440,915 A | 4/1969 | Weyant |
| 3,554,197 A | 1/1971 | Dobbie |
| 3,656,393 A | 4/1972 | Goellner |
| 3,706,474 A | 12/1972 | Neuenburg |
| 3,905,374 A | 9/1975 | Winter |
| 3,943,934 A | 3/1976 | Bent |
| 4,015,371 A | 4/1977 | Grayston |
| 4,059,930 A | 11/1977 | Alessio |
| 4,106,181 A | 8/1978 | Mattchen |
| 4,112,541 A | 9/1978 | Tetradis |
| 4,252,121 A | 2/1981 | Arnegger |
| 4,253,776 A | 3/1981 | Orain |
| 4,265,285 A | 5/1981 | Fodor |
| 4,386,609 A | 6/1983 | Mongeon |
| 4,393,626 A | 7/1983 | Schroer |
| 4,513,742 A | 4/1985 | Arnegger |
| 4,590,837 A | 5/1986 | Nanba |
| 4,597,227 A | 7/1986 | Gentischer et al. |
| 4,599,077 A | 7/1986 | Vuillard |
| 4,648,735 A | 3/1987 | Oddenino |
| 4,700,478 A | 10/1987 | Mezger et al. |
| 4,784,034 A | 11/1988 | Stones et al. |
| 4,825,091 A | 4/1989 | Breyer et al. |
| 4,891,884 A | 1/1990 | Torbet |
| 4,980,976 A | 1/1991 | Junginger et al. |
| 4,989,374 A | 2/1991 | Rudolf et al. |
| 5,022,188 A | 6/1991 | Borst |
| 5,027,684 A | 7/1991 | Neukam |
| 5,038,478 A | 8/1991 | Mezger et al. |
| 5,064,325 A | 11/1991 | McRoskey |
| 5,085,589 A | 2/1992 | Kan |
| 5,107,737 A | 4/1992 | Tagliaferri |
| 5,122,142 A | 6/1992 | Pascaloff |
| 5,157,873 A | 10/1992 | Rudolf et al. |
| 5,199,223 A | 4/1993 | Rudolf et al. |
| 5,219,378 A | 6/1993 | Arnold |
| 5,235,719 A | 8/1993 | Wimberley |
| 5,263,283 A | 11/1993 | Rudolf et al. |
| 5,265,343 A | 11/1993 | Pascaloff |
| 5,269,784 A | 12/1993 | Mast |
| D343,247 S | 1/1994 | Walen |
| 5,303,688 A | 4/1994 | Chiuminatta et al. |
| 5,306,025 A | 4/1994 | Langhoff |
| 5,306,285 A | 4/1994 | Miller et al. |
| 5,309,805 A | 5/1994 | Mezger et al. |
| 5,352,229 A | 10/1994 | Goble et al. |
| 5,366,312 A | 11/1994 | Raines |
| 5,382,249 A | 1/1995 | Fletcher |
| 5,423,825 A | 6/1995 | Levine |
| 5,425,606 A | 6/1995 | Kelch |
| 5,435,063 A | 7/1995 | Russo |
| D360,946 S | 8/1995 | Goris |
| 5,440,811 A | 8/1995 | Challis |
| D362,065 S | 9/1995 | Goris |
| 5,468,176 A | 11/1995 | Udert et al. |
| 5,468,247 A | 11/1995 | Matthai et al. |
| 5,480,507 A | 1/1996 | Arnold |
| 5,489,285 A | 2/1996 | Goris |
| 5,496,316 A | 3/1996 | Goris |
| D368,777 S | 4/1996 | Goble et al. |
| 5,507,763 A | 4/1996 | Petersen et al. |
| D374,286 S | 10/1996 | Goble et al. |
| D374,287 S | 10/1996 | Goble et al. |
| D374,482 S | 10/1996 | Goble et al. |
| 5,658,304 A | 8/1997 | Lim |
| 5,676,680 A | 10/1997 | Lim |
| 5,694,693 A | 12/1997 | Hutchins et al. |
| 5,702,415 A | 12/1997 | Matthai et al. |
| 5,729,904 A | 3/1998 | Trott |
| 5,735,866 A | 4/1998 | Adams et al. |
| D394,315 S | 5/1998 | Fisher |
| 5,785,571 A | 7/1998 | Camp |
| 5,829,931 A | 11/1998 | Doumani |
| 5,839,196 A | 11/1998 | Trott |
| 5,848,473 A | 12/1998 | Brandenburg, Jr. |
| D404,485 S | 1/1999 | Hutchins et al. |
| 5,857,237 A | 1/1999 | Dranginis |
| D405,177 S | 2/1999 | Hutchins et al. |
| D406,223 S | 3/1999 | Tran |
| 5,957,469 A | 9/1999 | Miles et al. |
| 6,022,353 A | 2/2000 | Fletcher et al. |
| 6,073,939 A | 6/2000 | Steadings et al. |
| 6,082,515 A | 7/2000 | Oono et al. |
| 6,099,397 A | 8/2000 | Wurst |
| 6,116,996 A | 9/2000 | Yanase |
| 6,132,282 A | 10/2000 | Camp |
| 6,132,300 A | 10/2000 | Martin |
| 6,179,301 B1 | 1/2001 | Steadings et al. |
| 6,196,554 B1 | 3/2001 | Gaddis et al. |
| 6,241,259 B1 | 6/2001 | Gaddis et al. |
| 6,340,022 B1 | 1/2002 | Schroer |
| D459,805 S | 7/2002 | Pascaloff |
| 6,430,465 B2 | 8/2002 | Cutler |
| 6,434,835 B1 | 8/2002 | Grunikiewicz et al. |
| 6,435,521 B2 | 8/2002 | Steadings et al. |
| D462,766 S | 9/2002 | Jacobs et al. |
| 6,488,287 B2 | 12/2002 | Gaddis et al. |
| 6,499,381 B2 | 12/2002 | Ladish et al. |
| 6,503,253 B1 | 1/2003 | Fletcher et al. |
| 6,536,536 B1 | 3/2003 | Gass et al. |
| 6,569,001 B2 | 5/2003 | Rudolf et al. |
| 6,629,484 B2 | 10/2003 | Seyama et al. |
| 6,678,062 B2 | 1/2004 | Haugen et al. |
| 6,705,807 B1 | 3/2004 | Rudolph et al. |
| 6,723,101 B2 | 4/2004 | Fletcher et al. |
| D489,823 S | 5/2004 | Fisher et al. |
| 6,747,745 B2 | 6/2004 | Ishikawa et al. |
| 6,796,888 B2 | 9/2004 | Jasch |
| 6,802,764 B2 | 10/2004 | Besch |
| 6,832,764 B2 | 12/2004 | Steadings et al. |

(56) References Cited

U.S. PATENT DOCUMENTS

| | | | |
|---|---|---|---|
| 6,834,730 B2 | 12/2004 | Gass et al. |
| 6,865,813 B2 | 3/2005 | Pollak |
| 6,869,346 B2 | 3/2005 | Wendt et al. |
| 6,945,862 B2 | 9/2005 | Jasch et al. |
| 6,949,110 B2 | 9/2005 | Ark et al. |
| 6,968,933 B2 | 11/2005 | Buckhouse et al. |
| 7,001,403 B2 | 2/2006 | Hausmann et al. |
| 7,015,445 B2 | 3/2006 | Bishop |
| 7,077,735 B2 | 7/2006 | Krondorfer et al. |
| 7,093,668 B2 | 8/2006 | Gass et al. |
| 7,107,691 B2 | 9/2006 | Nottingham et al. |
| 7,115,027 B2 | 10/2006 | Thomaschewski |
| 7,121,358 B2 | 10/2006 | Gass et al. |
| 7,128,503 B2 | 10/2006 | Steadings et al. |
| 7,169,025 B2 | 1/2007 | Schumacher |
| 7,175,625 B2 | 2/2007 | Culbert |
| 7,189,239 B2 | 3/2007 | Fisher et al. |
| 7,207,873 B2 | 4/2007 | Hesse et al. |
| 7,217,177 B2 | 5/2007 | Freeh et al. |
| D544,007 S | 6/2007 | Marasco |
| 7,225,714 B2 | 6/2007 | Rompel et al. |
| 7,237,988 B2 | 7/2007 | Steadings et al. |
| 7,258,351 B2 | 8/2007 | Hoffmann et al. |
| 7,258,515 B2 | 8/2007 | Krondorfer |
| 7,328,752 B2 | 2/2008 | Gass et al. |
| 7,334,511 B2 | 2/2008 | Hesselberg et al. |
| D563,186 S | 3/2008 | Ahn |
| 7,344,435 B2 | 3/2008 | Pollak et al. |
| 7,447,565 B2 | 11/2008 | Cerwin |
| 7,478,979 B2 | 1/2009 | Zhou et al. |
| 7,481,608 B2 | 1/2009 | Zhou et al. |
| 7,497,860 B2 | 3/2009 | Carusillo et al. |
| 7,527,628 B2 | 5/2009 | Fletcher et al. |
| 7,533,470 B2 | 5/2009 | Nottingham et al. |
| 7,537,065 B2 | 5/2009 | Gallagher et al. |
| 7,540,334 B2 | 6/2009 | Gass et al. |
| 7,690,871 B2 | 4/2010 | Steadings et al. |
| 7,699,566 B2 | 4/2010 | Nickels, Jr. et al. |
| 7,717,191 B2 | 5/2010 | Trautner |
| 7,717,192 B2 | 5/2010 | Schroeder et al. |
| 7,726,917 B2 | 6/2010 | Mack |
| 7,735,575 B2 | 6/2010 | Trautner |
| 7,746,448 B2 | 6/2010 | Franitza et al. |
| D619,152 S | 7/2010 | Evatt et al. |
| 7,753,381 B2 | 7/2010 | Nickels, Jr. et al. |
| 7,762,349 B2 | 7/2010 | Trautner et al. |
| 7,784,166 B2 | 8/2010 | Tanner |
| D623,034 S | 9/2010 | Evatt et al. |
| 7,798,245 B2 | 9/2010 | Trautner |
| 7,833,241 B2 | 11/2010 | Gant |
| 7,841,601 B2 | 11/2010 | Mack |
| 7,854,274 B2 | 12/2010 | Trautner et al. |
| D633,769 S | 3/2011 | Evatt et al. |
| D633,928 S | 3/2011 | Nilsson et al. |
| 7,901,424 B2 | 3/2011 | Fletcher et al. |
| 7,950,152 B2 | 5/2011 | Gallego |
| 7,976,253 B2 | 7/2011 | Steadings et al. |
| 7,987,920 B2 | 8/2011 | Schroeder et al. |
| 7,997,586 B2 | 8/2011 | Ziegler et al. |
| D646,539 S | 10/2011 | Maras |
| D646,540 S | 10/2011 | Maras |
| D646,542 S | 10/2011 | Wackwitz |
| 8,038,156 B2 | 10/2011 | Nickels, Jr. et al. |
| D648,762 S | 11/2011 | Mack |
| 8,047,100 B2 | 11/2011 | King |
| D651,062 S | 12/2011 | Wackwitz |
| 8,070,168 B2 | 12/2011 | Mack |
| 8,082,671 B2 | 12/2011 | Saegesser |
| D651,499 S | 1/2012 | Tong |
| D651,874 S | 1/2012 | Davidian et al. |
| D651,875 S | 1/2012 | Davidian et al. |
| D651,876 S | 1/2012 | Davidian et al. |
| D651,877 S | 1/2012 | Davidian et al. |
| D651,878 S | 1/2012 | Davidian et al. |
| D652,274 S | 1/2012 | Davidian et al. |
| D653,523 S | 2/2012 | Wackwitz et al. |
| 8,109,343 B2 | 2/2012 | Schroeder et al. |
| 8,113,520 B2 | 2/2012 | Zaiser et al. |
| 8,151,679 B2 | 4/2012 | Bohne |
| D665,242 S | 8/2012 | Wackwitz |
| D682,651 S | 5/2013 | McRoberts et al. |
| D682,652 S | 5/2013 | McRoberts et al. |
| D693,193 S | 11/2013 | Bozic |
| D694,077 S | 11/2013 | Bozic |
| D694,596 S | 12/2013 | Davidian et al. |
| D694,597 S | 12/2013 | Davidian et al. |
| D694,598 S | 12/2013 | Davidian et al. |
| D706,595 S | 6/2014 | Kaye et al. |
| 8,827,278 B2 * | 9/2014 | Chen ................ B25F 3/00 279/141 |
| 8,915,499 B2 | 12/2014 | Kaye et al. |
| 8,925,931 B2 | 1/2015 | Sergyenko et al. |
| 8,950,756 B2 * | 2/2015 | Lu ................ B25F 3/00 279/143 |
| 9,067,293 B2 | 6/2015 | Bernardi et al. |
| D734,649 S | 7/2015 | Wackwitz |
| 9,073,195 B2 | 7/2015 | Kaye, Jr. et al. |
| 9,186,770 B2 | 11/2015 | Montplaisir et al. |
| D746,655 S | 1/2016 | Wackwitz |
| 9,242,361 B2 | 1/2016 | Kaye, Jr. et al. |
| 9,346,183 B2 | 5/2016 | Fanhauser et al. |
| 9,486,887 B2 | 11/2016 | Fankhauser et al. |
| D789,759 S | 6/2017 | Fellmann et al. |
| D814,900 S | 4/2018 | Kaye, Jr. et al. |
| 10,245,744 B2 | 4/2019 | Morcos |
| 10,906,108 B2 * | 2/2021 | Rubens ................ B23D 61/006 |
| 10,946,544 B2 * | 3/2021 | Brown ................ B26D 7/2614 |
| 2001/0041524 A1 | 11/2001 | Steiger et al. |
| 2002/0070037 A1 | 6/2002 | Jasch |
| 2002/0104421 A1 | 8/2002 | Wurst |
| 2002/0116023 A1 | 8/2002 | Fletcher et al. |
| 2002/0198556 A1 | 12/2002 | Ark et al. |
| 2003/0014067 A1 | 1/2003 | Kullmer et al. |
| 2003/0032971 A1 | 2/2003 | Hausmann et al. |
| 2004/0098000 A1 | 5/2004 | Kleinwaechter |
| 2004/0138668 A1 | 7/2004 | Fisher et al. |
| 2004/0204731 A1 | 10/2004 | Gant |
| 2004/0243136 A1 | 12/2004 | Gupta et al. |
| 2005/0178261 A1 | 8/2005 | Thomaschewski |
| 2005/0245935 A1 | 11/2005 | Casey et al. |
| 2006/0150428 A1 | 7/2006 | Baculy |
| 2006/0172669 A1 | 8/2006 | Hesse et al. |
| 2006/0217048 A1 | 9/2006 | Freeh et al. |
| 2006/0272468 A1 | 12/2006 | Gupta et al. |
| 2006/0282108 A1 | 12/2006 | Tanner |
| 2007/0060030 A1 | 3/2007 | Pollak et al. |
| 2007/0093190 A1 | 4/2007 | Schomisch |
| 2007/0229853 A1 | 10/2007 | Cheng |
| 2007/0266837 A1 | 11/2007 | Nickels et al. |
| 2007/0295156 A1 | 12/2007 | Ziegler et al. |
| 2007/0295165 A1 | 12/2007 | Tanaka et al. |
| 2008/0027449 A1 | 1/2008 | Gundlapalli et al. |
| 2008/0190259 A1 | 8/2008 | Bohne |
| 2008/0196911 A1 | 8/2008 | Krapf et al. |
| 2009/0013540 A1 | 1/2009 | Bohne |
| 2009/0023371 A1 | 1/2009 | Blickle et al. |
| 2009/0051094 A1 | 2/2009 | Sandmeier |
| 2009/0093815 A1 | 4/2009 | Fletcher et al. |
| 2009/0138017 A1 | 5/2009 | Carusillo et al. |
| 2009/0197514 A1 | 8/2009 | Peisert |
| 2009/0198465 A1 | 8/2009 | Decker et al. |
| 2009/0277022 A1 | 11/2009 | Limberg et al. |
| 2009/0312761 A1 | 12/2009 | Boykin et al. |
| 2009/0312762 A1 | 12/2009 | Boykin |
| 2009/0312779 A1 | 12/2009 | Boykin et al. |
| 2009/0318065 A1 | 12/2009 | Zaiser et al. |
| 2009/0320625 A1 | 12/2009 | Kildevaeld |
| 2009/0321625 A1 | 12/2009 | Sieradzki et al. |
| 2010/0003906 A1 | 1/2010 | Zaiser et al. |
| 2010/0009613 A1 | 1/2010 | Frueh |
| 2010/0052269 A1 | 3/2010 | Zaiser et al. |
| 2010/0056029 A1 | 3/2010 | Grunikiewicz |
| 2010/0193207 A1 | 8/2010 | Mok et al. |
| 2010/0197208 A1 | 8/2010 | Blickle et al. |

(56) References Cited

U.S. PATENT DOCUMENTS

| | | | |
|---|---|---|---|
| 2010/0288099 A1 | 11/2010 | Steiger |
| 2010/0300714 A1 | 12/2010 | Trautner |
| 2011/0000690 A1 | 1/2011 | Kildevaeld |
| 2011/0011605 A1 | 1/2011 | Kildevaeld |
| 2011/0067894 A1 | 3/2011 | Bernardi |
| 2011/0072946 A1 | 3/2011 | Bernardi et al. |
| 2011/0086582 A1 | 4/2011 | Takemura et al. |
| 2011/0097978 A1 | 4/2011 | Hofmann et al. |
| 2011/0127731 A1 | 6/2011 | Woecht et al. |
| 2011/0139472 A1 | 6/2011 | Bohne |
| 2011/0147023 A1 | 6/2011 | Herr |
| 2011/0227300 A1 | 9/2011 | Zhang et al. |
| 2011/0266757 A1 | 11/2011 | Steadings et al. |
| 2011/0266758 A1 | 11/2011 | Sergyeyenko et al. |
| 2011/0266759 A1 | 11/2011 | Goldman |
| 2011/0316241 A1 | 11/2011 | Zhang et al. |
| 2011/0291368 A1 | 12/2011 | Chen et al. |
| 2011/0309589 A1 | 12/2011 | Maras |
| 2011/0315414 A1 | 12/2011 | Kuntner et al. |
| 2011/0316242 A1 | 12/2011 | Zhang et al. |
| 2012/0025476 A1 | 2/2012 | Nickels, Jr. et al. |
| 2012/0031636 A1 | 2/2012 | King |
| 2012/0073410 A1 | 3/2012 | Hoffman et al. |
| 2012/0090863 A1 | 4/2012 | Puzio et al. |
| 2012/0144971 A1 | 6/2012 | Bohne |
| 2012/0169018 A1 | 7/2012 | Lu et al. |
| 2013/0104719 A1 | 5/2013 | Rubens et al. |
| 2013/0193655 A1 | 8/2013 | Kaye et al. |
| 2014/0035242 A1 | 2/2014 | Kaye et al. |
| 2014/0182873 A1 | 7/2014 | Fankhauser et al. |
| 2014/0252729 A1 | 9/2014 | Xu |
| 2014/0299345 A1 | 10/2014 | McRoberts et al. |
| 2014/0325855 A1 | 11/2014 | Bozic |
| 2016/0184956 A1 | 6/2016 | Klabunde et al. |
| 2016/0199919 A1 | 7/2016 | Klabunde et al. |
| 2016/0288288 A1 | 10/2016 | Klabunde et al. |

FOREIGN PATENT DOCUMENTS

| | | |
|---|---|---|
| CN | 201728642 | 2/2011 |
| DE | 1878647 U | 8/1963 |
| DE | 2915292 A1 | 10/1980 |
| DE | 2935731 A1 | 4/1981 |
| DE | 3203670 A1 | 8/1983 |
| DE | 3520417 A1 | 12/1985 |
| DE | 3833735 A1 | 4/1989 |
| DE | 8618695 U1 | 9/1989 |
| DE | 4036904 C1 | 5/1992 |
| DE | 4209146 A1 | 9/1992 |
| DE | 29605728 U1 | 9/1996 |
| DE | 29607061 U1 | 10/1996 |
| DE | 29810157 U1 | 8/1998 |
| DE | 19736933 C1 | 10/1998 |
| DE | 29907671 U1 | 8/1999 |
| DE | 29809788 U1 | 9/1999 |
| DE | 19825408 A1 | 12/1999 |
| DE | 20303018 U1 | 4/2003 |
| DE | 10231393 | 1/2004 |
| DE | 10307840 B3 | 6/2004 |
| DE | 10325392 A1 | 12/2004 |
| DE | 102004020982 A1 | 11/2005 |
| DE | 202006001643 U1 | 3/2006 |
| DE | 102004050799 A1 | 4/2006 |
| DE | 102007018465 A1 | 10/2008 |
| DE | 102007018467 A1 | 10/2008 |
| DE | 202009004549 U1 | 6/2009 |
| DE | 202008001759 U1 | 7/2009 |
| DE | 102008001234 A1 | 10/2009 |
| DE | 202009013147 U1 | 1/2010 |
| DE | 202008011959 U1 | 2/2010 |
| DE | 102009030854 A1 | 1/2011 |
| DE | 202011050511 U1 | 11/2011 |
| DE | 202011051408 U1 | 2/2012 |
| DE | 102011005818 A1 | 9/2012 |
| DE | 102011085561 A1 | 12/2012 |
| DE | 102012201624 A1 | 8/2013 |
| EP | 0443362 A2 | 8/1991 |
| EP | 0554929 A1 | 8/1993 |
| EP | 0695607 A1 | 2/1996 |
| EP | 0776634 A2 | 6/1997 |
| EP | 0962283 A1 | 12/1999 |
| EP | 1694477 A1 | 6/2005 |
| EP | 1687120 A1 | 8/2006 |
| EP | 1819490 A1 | 8/2007 |
| EP | 1852218 A1 | 11/2007 |
| EP | 1882538 A2 | 1/2008 |
| EP | 2085182 A1 | 8/2009 |
| EP | 2143531 A1 | 1/2010 |
| EP | 2152475 A1 | 2/2010 |
| EP | 2159000 A1 | 3/2010 |
| JP | 1158205 A | 6/1989 |
| JP | 2006263914 A | 10/2006 |
| WO | WO-9424945 A1 | 11/1994 |
| WO | WO-03097299 A1 | 11/2003 |
| WO | WO-2004043269 A1 | 5/2004 |
| WO | WO-2005056256 A1 | 6/2005 |
| WO | WO-2006017066 A2 | 2/2006 |
| WO | WO-2008151866 A1 | 12/2008 |
| WO | WO-2009151958 A2 | 12/2009 |
| WO | WO-2009151959 A1 | 12/2009 |
| WO | WO-2009151965 A1 | 12/2009 |
| WO | WO-2010020458 A1 | 2/2010 |
| WO | WO-2013067960 A1 | 5/2013 |

OTHER PUBLICATIONS

Zimmer, Inc., Brochure "More Versatile 'Graft' Blades Available" dated Feb. 15, 1993, 2 pages; © 1993 Zimmer, Inc.

Materials from Stryker Corporation Brochure published prior to Jan. 1, 1994.

Aloe Medical Instruments "Gall Ball Retractor" Item B-1323, p. 115 ©1965.

Stryker Maintenance Manual entitled "System II OrthoPower 90 Battery Powered Surgical Instruments"—For Use With: 298-92, 94,96, 98 (Stryker Surgical Brochure 298-92-16 Rev (Mar. 1986).

Sketch A related to p. 9 of the Stryker Maintenance Manual entitled "System II OrthoPower 90 Battery Powered Surgical Instruments" (Mar. 1986).

Hall Surgical brochure—New Opposed-Tooth Blades—published prior to Jan. 1, 1994.

Dremel 6300-05 120-volt Multi-Max Oscillating Kit (retrieved on Sep. 30, 2014) viewed on the internet.https://web.archive.org/web/20091224220316/http://www.amazon.com/Dremel-6300-05-120-Volt-Multi-Max-Oscillating/dp/B002WTCDXO published on Dec. 24, 2009 as per Wayback Machine.

Dewaele, Karl—European Search Report—dated Jun. 20, 2014—7 pages—The Haque.

O'Connell, Wayne—Patent Examination Report No. 3 re Australian Patent Application No. 2011201633—dated Oct. 2, 2014—6 pages—Woden ACT, Canberra, Australia.

Dewaele, Karl—Examination Report re: European Patent Appln. No. 15160839.5-1701—dated Nov. 9, 2016—6 pages.

Kornmeier, Martin—Extended European Search Report re European Application No. 13163,355.4—dated Nov. 27, 2017—5 pages—Munich.

Dewaele, Karl—European Search Report re European Patent Appln. No. 18181208.2-1019—dated Oct. 16, 2018—9 pages.

Translation of: Bosch & Fein, Communication of a notice of Opposition against EP 3 456 473 (18200787.2), Oscillating Tool Adapter, Black & Decker Inc., EPO Munich, dated Feb. 18, 2021.

Kornmeier, Martin—Search Report re European Patent Application No. 18200787.2-1016—dated Feb. 14, 2019—4 pages—Munich.

Kornmeier, Martin—Search Report re European Patent Application No. 18200791.4-1016—dated Feb. 14, 2019—4 pages—Munich.

Kornmeier, Martin—Search Report re European Patent Application Application No. 18200668.4-1016—dated Feb. 14, 2019—4 pages—Munich.

Kornmeier, Martin—Communication Pursuant to Article 94(3) EPC re European Patent Application No. 18200787.2-1016—dated Mar. 13, 2019—6 pages—Munich.

(56) References Cited

OTHER PUBLICATIONS

Kornmeier, Martin—Communication Pursuant to Article 94(3) EPC re European Patent Application No. 18200791.4-1016—dated Mar. 13, 2019—6 pages—Munich.
Kornmeier, Martin—Communication Pursuant to Article 94(3) EPC re European Patent Application No. 18200668.4-1016—dated Mar. 13, 2019—6 pages—Munich.
Bosch & Fein, Communication of a notice of Opposition against EP 3 348 367 (17191446.8), Accessories for Oscillating Power Tools, Black & Decker Inc., EPO Munich,dated Jan. 11, 2021.
Translation of: Bosch & Fein, Communication of a notice of Opposition against EP 3 348 367 (17191446.8), Accessories for Oscillating Power Tools, Black & Decker Inc., EPO Munich,dated Jan. 11, 2021.
Bosch & Fein, Communication of a notice of Opposition against EP 3 456 473 (18200787.2), Oscillating Tool Adapter, Black & Decker Inc., EPO Munich, dated Feb. 18, 2021.
Pages 2, 3 and 5 of Stryker prior art brochure/—catalog No. 1420 Standard Bone Saw Handpiece, 1100 Series saw blades, and No. 1470 Sagittal Plane bone saw with Series 1370 blades, published before Jul. 16, 2012.
Bosch & Fein, Communication of a notice of opposition against EP 3 418 004 (18181208.2), Universal Accessories for Oscillating Tools, Black & Decker Inc., EPO Munich, dated Mar. 5, 2021.
Translation of Bosch & Fein, Communication of a notice of opposition against EP 3 418 004 (18181208.2), Universal Accessories for Oscillating Tools, Black & Decker Inc , EPO Munich, dated Mar. 5, 2021.

\* cited by examiner

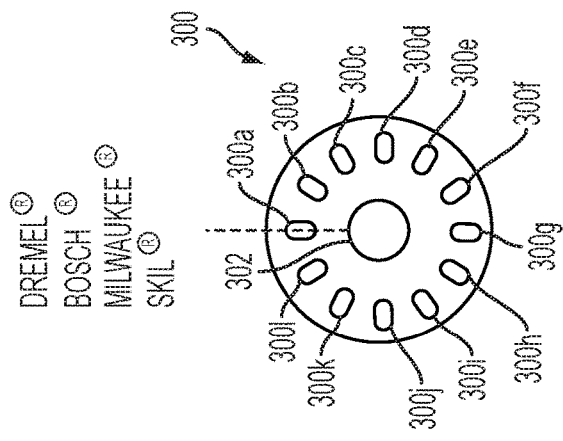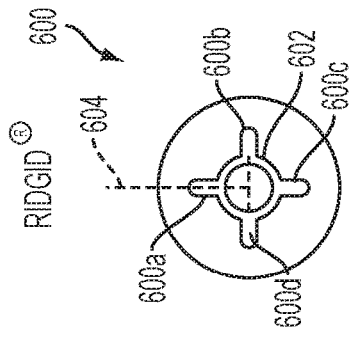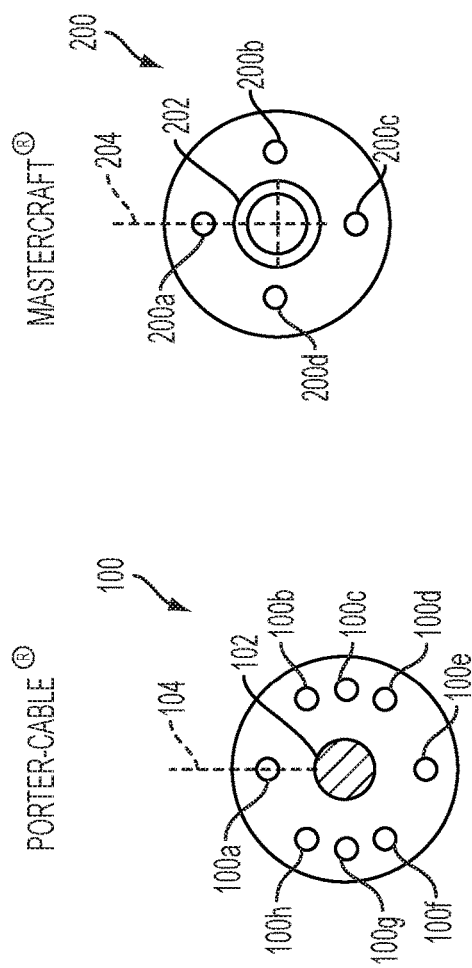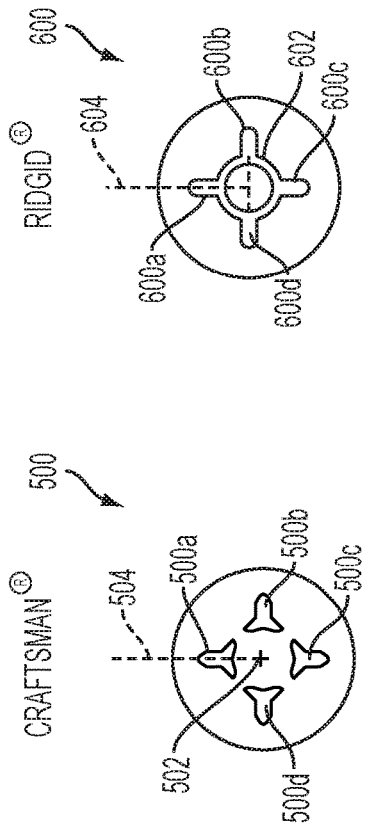

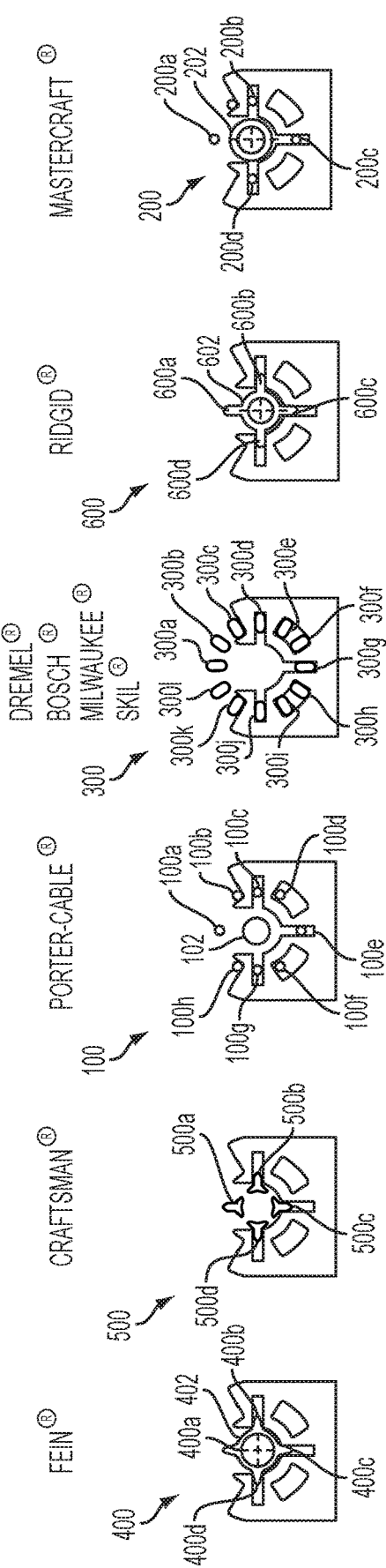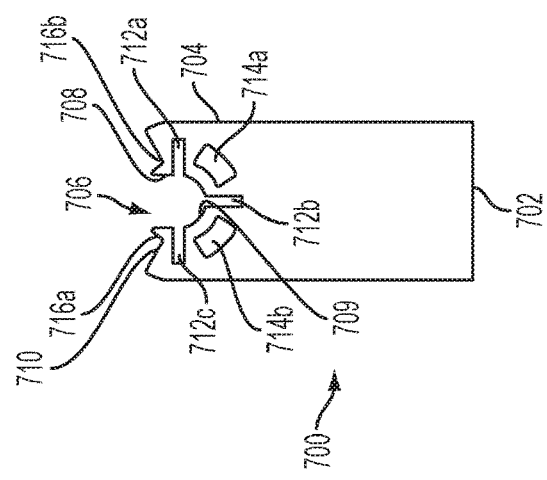

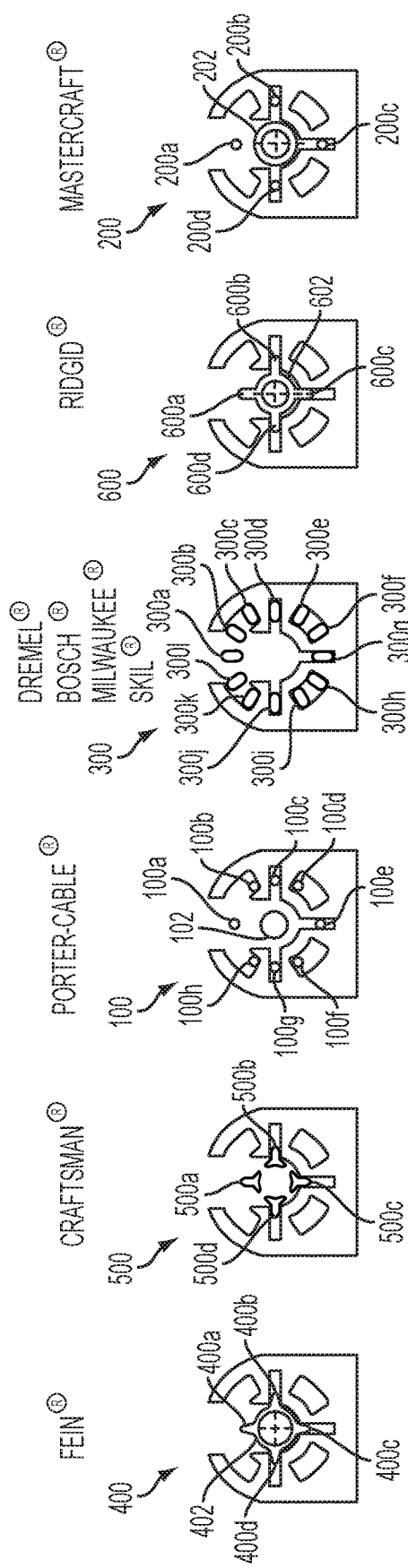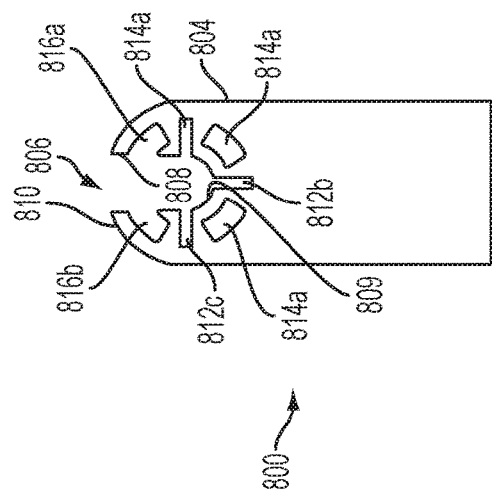

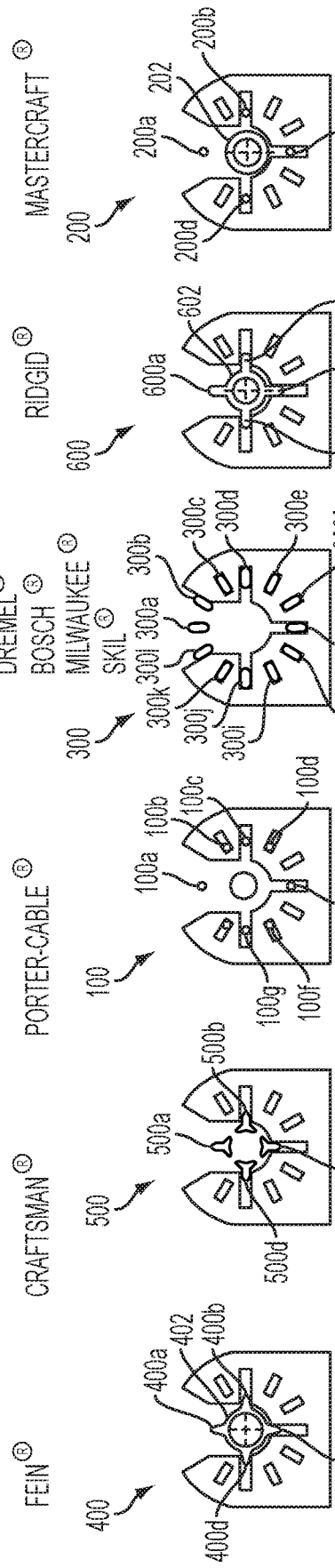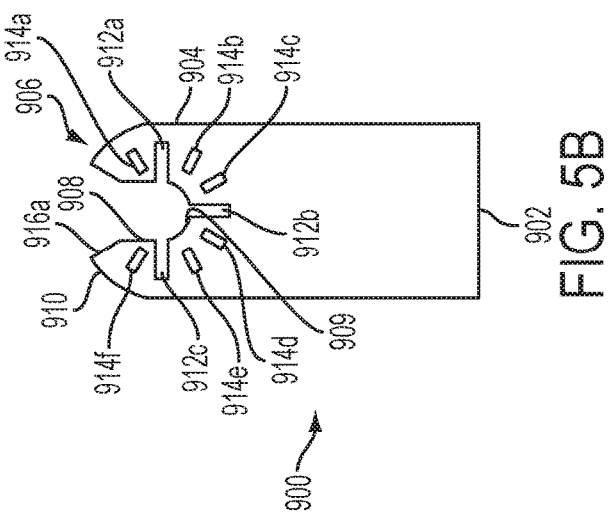

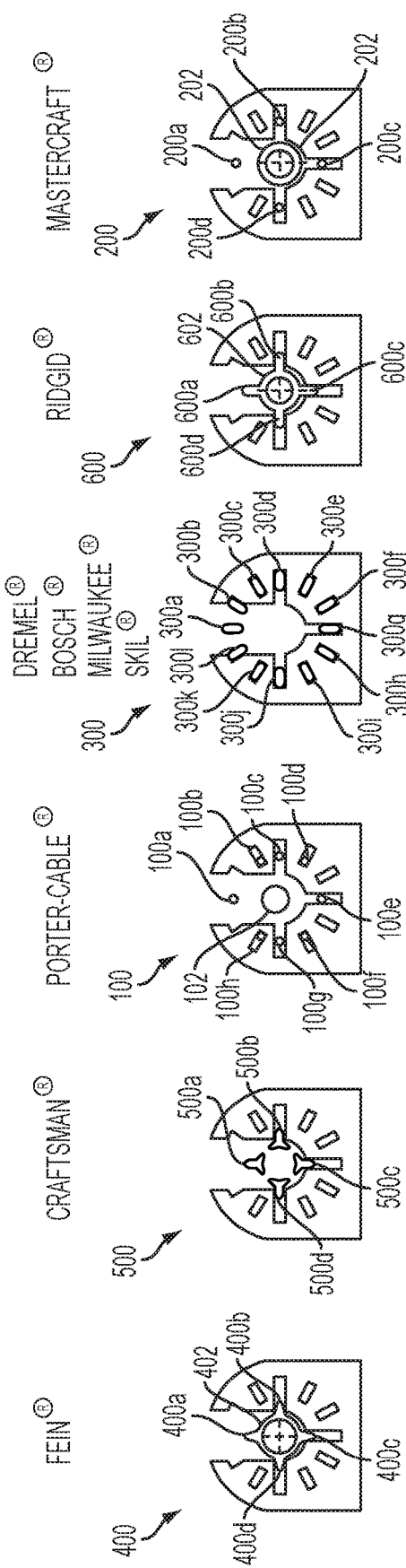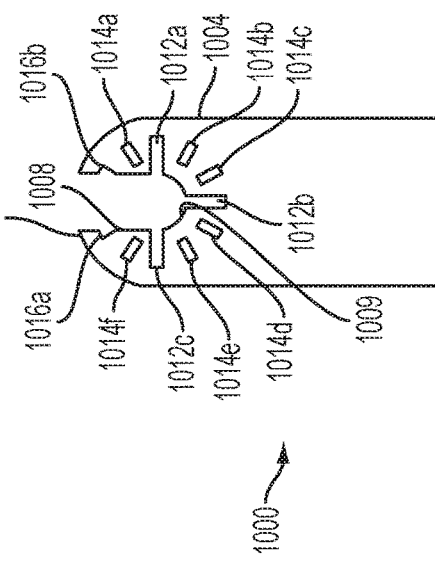

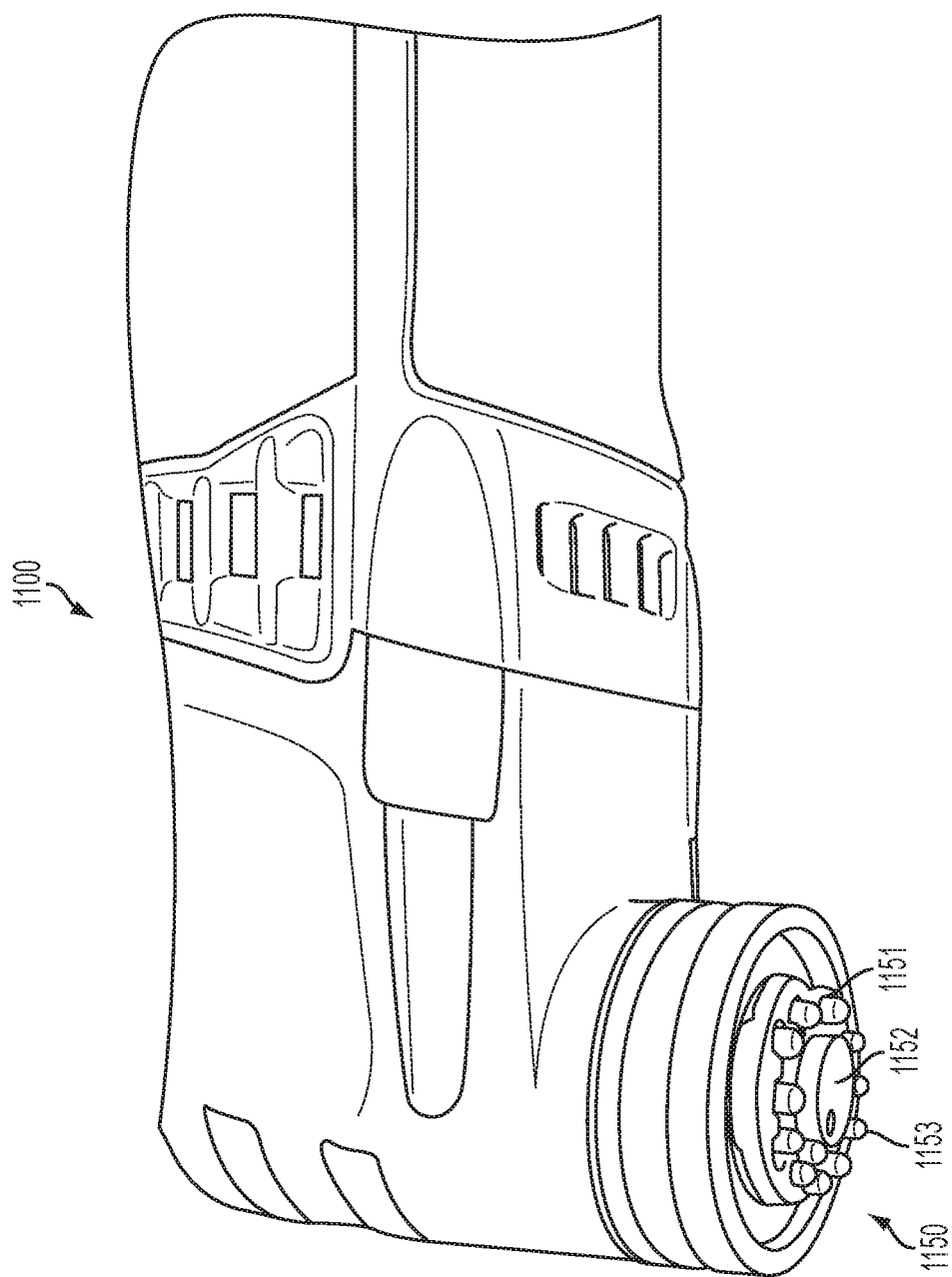

ACCESSORIES FOR OSCILLATING POWER TOOLS

CROSS REFERENCE TO RELATED APPLICATIONS

This application claims priority as a continuation of U.S. patent application Ser. No. 16/278,423, filed Apr. 13, 2020, titled "Oscillating Power Tools and Accessories," which is a continuation of U.S. patent application Ser. No. 16/026,408, filed Jul. 3, 2018, titled "Universal Accessories for Oscillating Power Tools," now U.S. Pat. No. 10,245,716, which is a continuation of U.S. patent application Ser. No. 14/968,973, filed Dec. 15, 2015, titled "Universal Accessories for Oscillating Power Tools," now U.S. Pat. No. 10,040,186, which is a continuation of U.S. patent application Ser. No. 13/781,900, filed Mar. 1, 2013, titled "Universal Accessories for Oscillating Power Tools," now U.S. Pat. No. 9,242,361, which is a continuation-in-part of U.S. patent application Ser. No. 13/385,614, filed Jul. 16, 2012, titled "Universal Accessory for Oscillating Power Tools," now U.S. Pat. No. 9,073,195. Each of the aforementioned patent applications is incorporated herein by reference.

The entire disclosures of each the following patent applications also are incorporated herein by reference: U.S. Provisional Patent Application No. 61/664,454, filed on Jun. 26, 2012, U.S. Provisional Patent Application No. 61/622,894 filed Apr. 11, 2012, U.S. patent application Ser. No. 13/362,637 filed on Jan. 31, 2012, U.S. patent application Ser. No. 12/942,098 filed on Nov. 9, 2010, and U.S. Provisional Patent Application No. 61/329,480, filed Apr. 29, 2010.

TECHNICAL FIELD

This application relates to accessories (such as cutting tools, saw blades, and sanding tools) for oscillating power tools.

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. Different brands of oscillating power tools tend to have different, often proprietary, accessory attachment mechanisms. It is desirable to have oscillating accessories with a universal attachment portion that can be attached to a multitude of different brands of oscillating power tools.

SUMMARY

In an aspect, an accessory for coupling to an attachment mechanism of an oscillating power tool includes a working end, an opposite rear end, and a fitment portion adjacent the rear end. The fitment portion comprises a plurality of openings configured to receive projections on the attachment mechanisms on a plurality of different brands of oscillating power tools, e.g., oscillating power tools sold under the brand names Porter-Cable®, Mastercraft®, Dremel®, Bosch®, Milwaukee®, Skil®, Fein®, Craftsman®, and Ridgid®.

Implementations of this aspect may include one or more of the following features.

The plurality of openings include a generally U-shaped opening that is open at the rear end, a first set of openings in communication with and extending radially outward from the U-shaped opening, a second set of openings not in communication with and positioned radially outward from the U-shaped opening, and a third set of openings adjacent the rear end. The U-shaped opening is configured to receive a post of a Porter-Cable® branded oscillating power tool, and a central projection a Fein®, a Ridgid®, and a Mastercraft® branded oscillating power tool. The first set of openings is configured to receive round projections of Porter-Cable® branded oscillating power tools, round projections of Mastercraft® banded oscillating power tools, oblong projections of Dremel®, Bosch®, Milwaukee®, and Skil® branded oscillating power tools, radial projections Fein® branded oscillating power tools, radial projections of Craftsman® branded oscillating power tools, and radial projections of Ridgid® branded oscillating power tools. The second set of openings is configured to receive round projections of Porter-Cable® branded power tools, and oblong projections of Dremel®, Bosch®, Milwaukee®, and Skil® branded power tools. The third set of recesses is configured to receive round projections of Porter-Cable® branded oscillating power tools, and oblong projections of Dremel®, Bosch®, Milwaukee®, and Skil® branded oscillating power tools.

The first set of openings may include radial arm slots at 90, 180, and 270 degrees. The second set of openings may include arc-shaped slots between pairs of openings the first set of openings. Alternatively, the second set of openings may include radial slots not connected with the U-shaped opening. The third set of openings may include notches in the rear end. Alternatively, the third set of openings may include notches formed in the U-shaped opening. In another alternative, the third set of openings may include chamfers tapering outward from the U-shaped opening to the rear end.

In another aspect, an accessory for coupling to an attachment mechanism of an oscillating power tool includes a working end, an opposite rear end, and a fitment portion adjacent the rear end portion. The fitment portion includes a generally U-shaped opening open at the rear end. The generally U-shaped opening has a central portion thereof that is configured to receive a post of a tool clamping mechanism. The fitment portion further includes a first plurality of openings in communication with and extending radially outward from the central portion, a second plurality of openings not in communication with and positioned radially outward from the central portion. The central portion of the U-shaped opening, the first plurality of openings, and the second plurality of openings are configured to couple the fitment portion to a plurality of different configurations of attachment mechanisms for oscillating power tools.

Implementations of this aspect may include one or more of the following features.

The working end includes at least one of a cutting edge, a saw blade, a sanding surface, and an abrading surface. The central portion of the U-shaped opening is generally semicircular. The first plurality of openings includes a first radial arm slot extending from the central portion at 90 degrees to the U-shaped opening, a second radial arm slot extending from the central portion at 180 degrees to the U-shaped opening, and a third radial arm slot extending from the central portion at 270 degrees from the U-shaped opening. The second plurality of openings includes a first arc-shaped slot spaced radially outward from the central portion between the first and second radial arm openings, and a second arc-shaped slot spaced radially outward from the central portion between the second and third radial arm openings.

The first arc shaped slot subtends an angle of approximately 120 degrees to approximately 150 degrees relative to the U-shaped opening, and the second arc shaped slot subtends an angle of approximately 210 degrees to approximately 240 degrees relative to the U-shaped opening. The second plurality of openings includes a first pair of radial openings spaced radially from the central portion of the U-shaped opening and between the first and second radial arm slots, and a second pair of radial openings spaced radially from the central portion and between the second and third radial arm slots. The first pair of radial openings are at angles of approximately 120 degrees and approximately 150 degrees relative to the U-shaped opening, and the second pair of radial openings are at angles of approximately 210 degrees and approximately 240 degrees relative to the U-shaped opening.

The second plurality of openings further includes a third radial opening spaced radially from the central portion between the first radial arm slot and the U-shaped opening, and a fourth radial opening spaced radially from the central portion between the third radial arm slot and the U-shaped opening. The third radial opening is at an angle of approximately 60 degrees relative to the U-shaped opening, and the fourth radial opening is at an angle of approximately 300 degrees relative to the U-shaped opening. The fitment portion further includes a third plurality of openings extending circumferentially from the U-shaped opening, and spaced from the central portion. The third plurality of openings comprises a plurality of arc-shaped openings extending from the U-shaped opening and radially spaced from the central portion. The third plurality of openings comprises a pair of notches extending circumferentially from the U-shaped opening and radially spaced from the central portion.

The third plurality of openings comprises radial chamfers tapering outward from the U-shaped opening to the rear end. An adapter includes a generally a disc-like body with a central portion and a radial opening extending from the central portion to a periphery of the body, wherein the central portion of the body has a smaller diameter than the central portion of the fitment portion. The adapter further comprises a plurality of radial slots extending from the periphery and spaced radially outward from the central portion. The central portion, the first plurality of openings, and the second plurality of openings are configured to couple the fitment portion to at least three different configurations of accessory attachment mechanism on different brands of oscillating power tools.

In another aspect, an oscillating power tool and accessory includes a housing, a motor contained in the housing, a spindle extending from the housing, a transmission coupled to the motor and the spindle and configured to convert rotational motion of the motor to oscillating motion of the output shaft, an accessory attachment mechanism connected to the spindle for oscillating motion with the spindle, and an oscillating accessory. The accessory attachment mechanism has a clamping face with a plurality of projections, and a moveable flange portion coupled to the clamping face. The oscillating accessory is configured to be clamped between the clamping face and the flange portion. The oscillating accessory has a working end, an opposite rear end, and a fitment portion adjacent the rear end portion. The fitment portion includes a generally U-shaped opening open at the rear end in communication with a central portion, a first plurality of openings in communication with and extending radially outward from the central portion, and a second plurality of openings not in communication with and positioned radially outward from the central portion. The first and second plurality of openings are configured to receive the plurality of projections on the clamping face. The central portion, the first plurality of openings, and the second plurality of openings are configured to be coupled to at least one other oscillating power tool having a different configuration of projections.

Implementations of this aspect may include one or more of the following features. An adapter includes a generally a disc-like body with a central portion and a radial opening extending from the central portion to a periphery of the body. The central portion of the body has a smaller diameter than the central portion of the fitment portion. A plurality of radial slots extend from the periphery and spaced radially outward from the central portion.

In another aspect, an adapter is disclosed for enhancing retention of an oscillating accessory in a clamping mechanism of an oscillating power tool. The oscillating accessory has a central portion having a first diameter, and the clamping mechanism having a plurality of projections. The adapter includes a generally a disc-like body having a peripheral edge, a central portion in the disc-like body, and a radial opening extending from the central portion to the peripheral edge of the disc-like body. The central portion has a smaller diameter than the central portion of the accessory. A plurality of radial slots extend from the peripheral edge and spaced radially outward from the central portion.

Advantages may include being able to couple the accessories to numerous different brands and configurations of oscillating power tools, including, but not limited to Cable®, Mastercraft®, Dremel®, Bosch®, Milwaukee®, Skil®, Fein®, Craftsman®, and Ridgid® branded oscillating power tools. Other advantages and features will be apparent from the description and the drawings.

BRIEF DESCRIPTION OF THE DRAWINGS

FIGS. 2A-2F are schematic views of accessory attachment mechanisms for various brands of oscillating power tools.

FIGS. 3A-3H illustrate a first embodiment of a universal accessory attachment mechanism, including showing how the accessory fits to the accessory attachment mechanisms of FIGS. 2A-2F.

FIGS. 4A-4H illustrate a second embodiment of a universal accessory attachment mechanism, including showing how the accessory fits to the accessory attachment mechanisms of FIGS. 2A-2F.

FIGS. 5A-5H illustrate a third embodiment of a universal accessory attachment mechanism, including showing how the accessory fits to the accessory attachment mechanisms of FIGS. 2A-2F.

FIGS. 6A-6H illustrate a fourth embodiment of a universal accessory attachment mechanism, including showing how the accessory fits to the accessory attachment mechanisms of FIGS. 2A-2F.

FIGS. 7A-7B are perspective views of a third embodiment of an oscillating power tool.

DETAILED DESCRIPTION

Figure 1A:
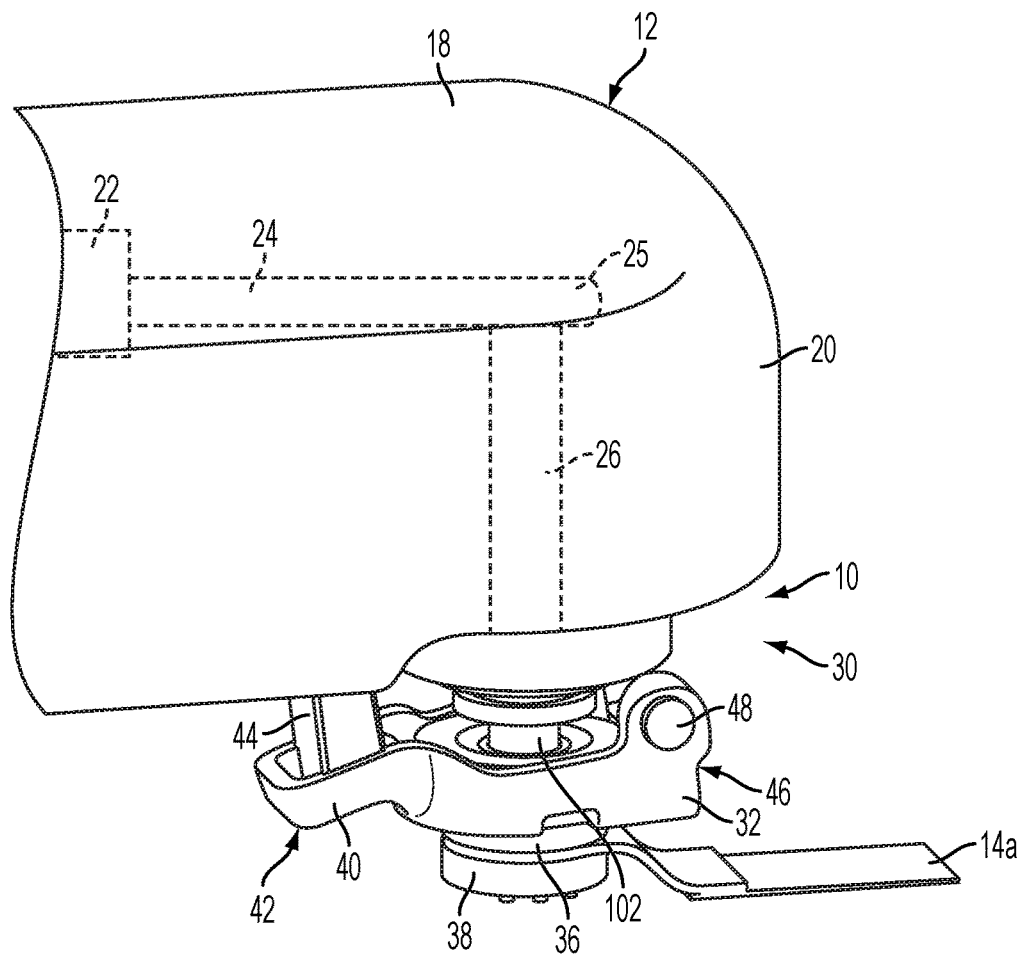
FIG. 1A is a perspective view of a first embodiment of an oscillating power tool.

Referring to FIG. 1A, a first embodiment of an oscillating power tool 12 includes a tool body 18 including a housing 20 that contains a motor 22 to drive an output member 24. The output spindle 26 is coupled to the motor 22 via a transmission 25 that converts rotary motion of the motor 22 to oscillating motion of the spindle 26. The output of the spindle 26 is coupled to a first type of accessory attachment mechanism 10.

Figure 1B:
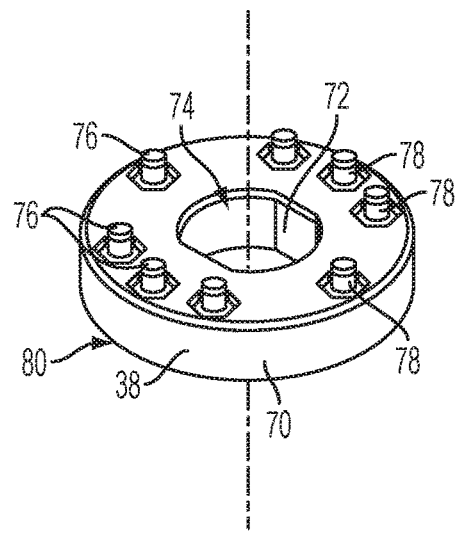
FIG. 1B is a perspective view of a portion of an accessory attachment mechanism of the oscillating power tool of FIG. 1A.

Referring also FIG. 1B, the first type of accessory attachment mechanism 10 does not require the use of a separate tool to couple a blade to the oscillating power tool (also known as a "tool-free" attachment mechanism). An exemplary tool-free attachment mechanism 10 includes a clamp assembly 30 having a first clamp member 36 fixedly coupled to the output spindle, a second clamp member 38 facing the first clamp member 36, and a lever 32 coupled to the second clamp member 38. The lever 32 includes a lever arm 40 with a user engagement portion 42 and a block 44. The lever 32 further includes a pivot portion 46 having a pivot axle 48. The second clamp member 38 includes a second clamp body 70 generally in the form of a ring having a central opening 72. The second clamp body 70 has a second clamping surface 74 having a plurality of mounting features 76 formed thereon. In the example shown, the plurality of mounting features 76 are in the form of male projections 78. In the particular example shown, eight protrusions each having a circular cross section and a tapered shape or form are provided. An oscillating accessory 14a (in this case a saw blade) is removably clamped between the first and second clamp members 36, 38, and includes a plurality of openings that receive the male projections 78 so as to inhibit rotation of the oscillating accessory 14a relative to the clamp members 36, 38.

Figure 1C:
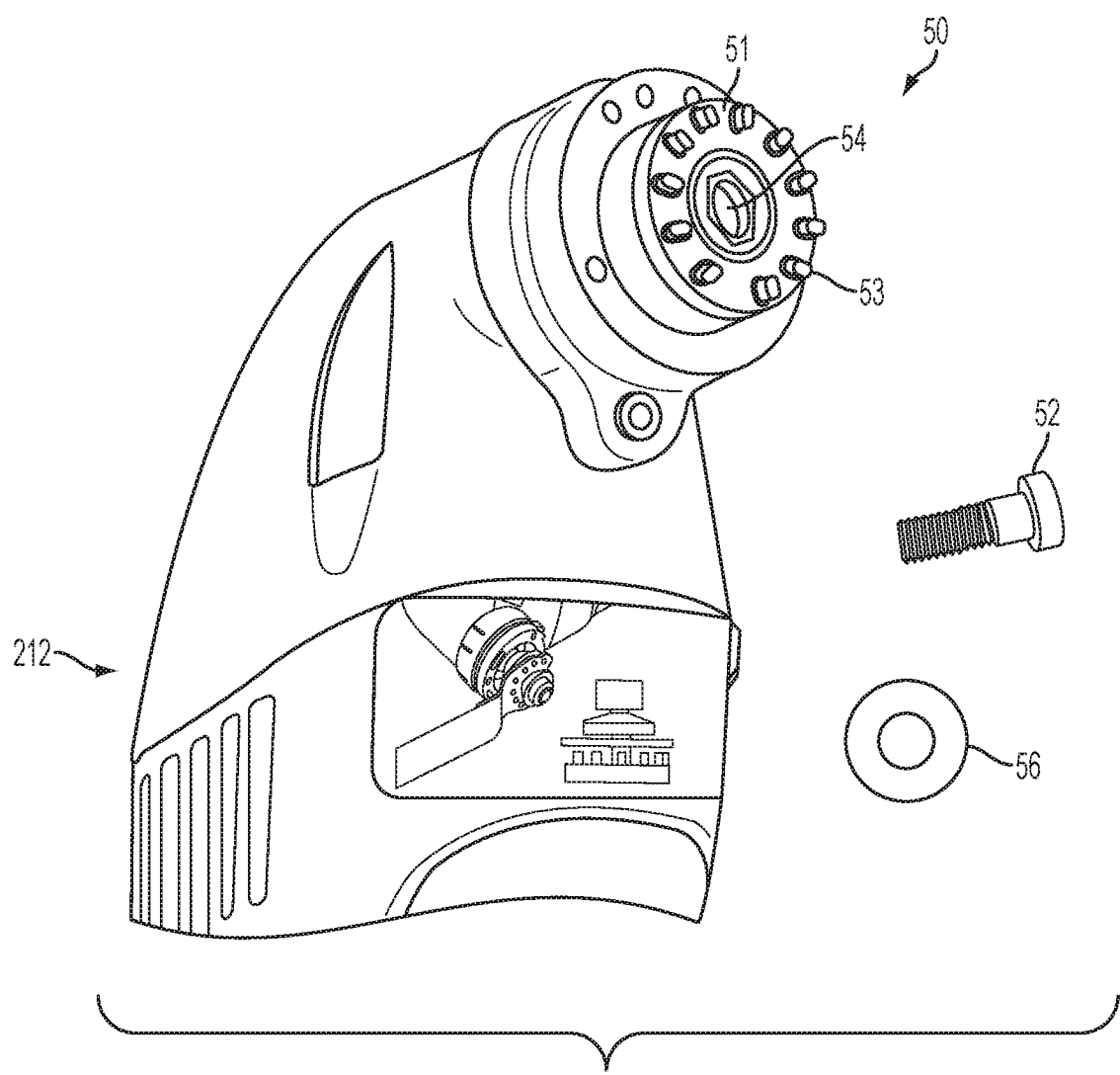
FIG. 1C is a perspective view of a second embodiment of an oscillating power tool.
Figure 1D:
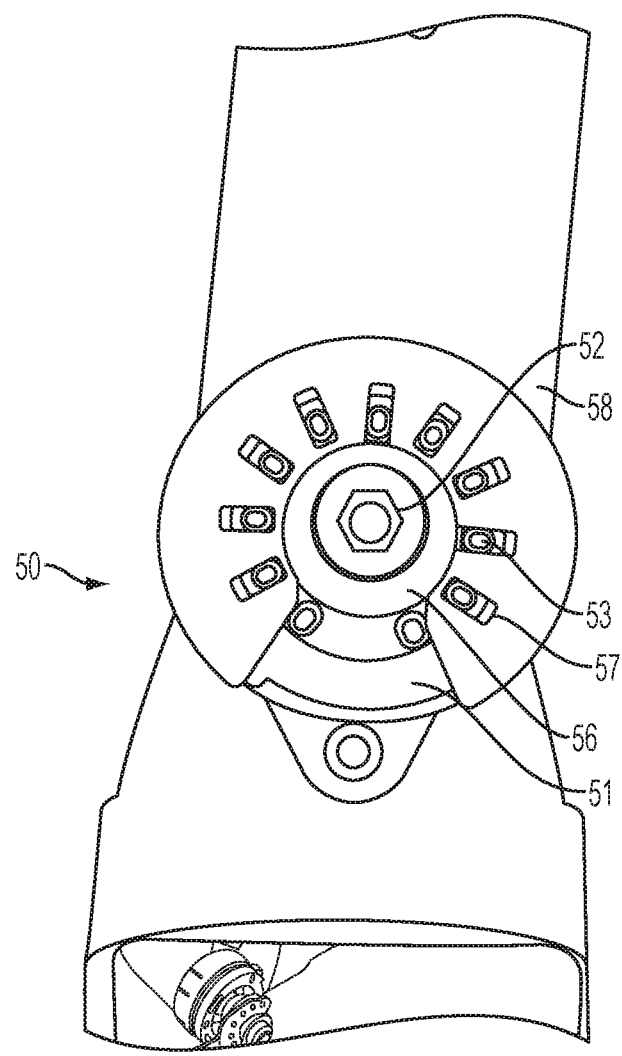
FIG. 1D is a bottom view of the oscillating power tool of FIG. 1C.
Figure 3A:
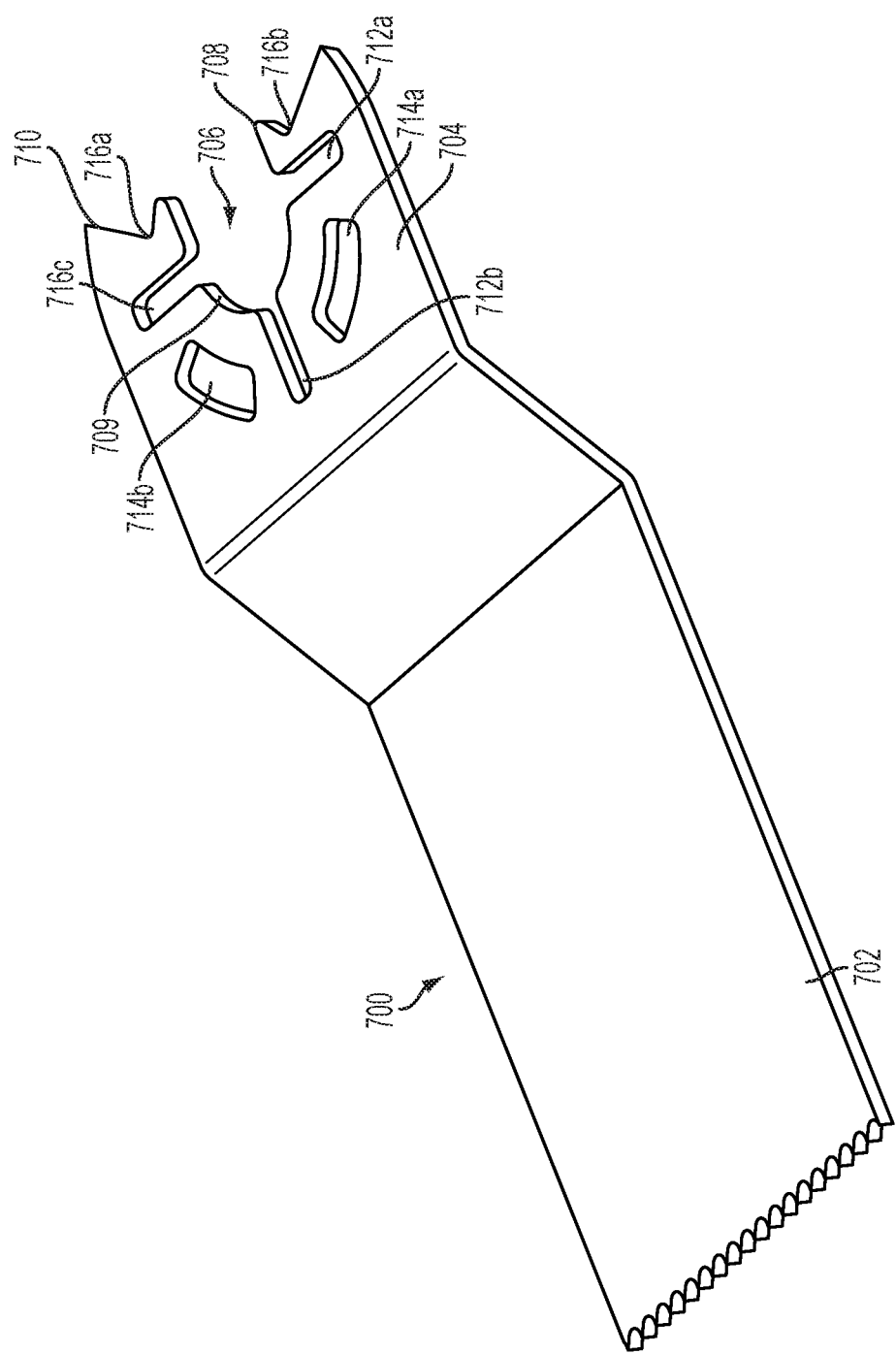
Figure 4A:
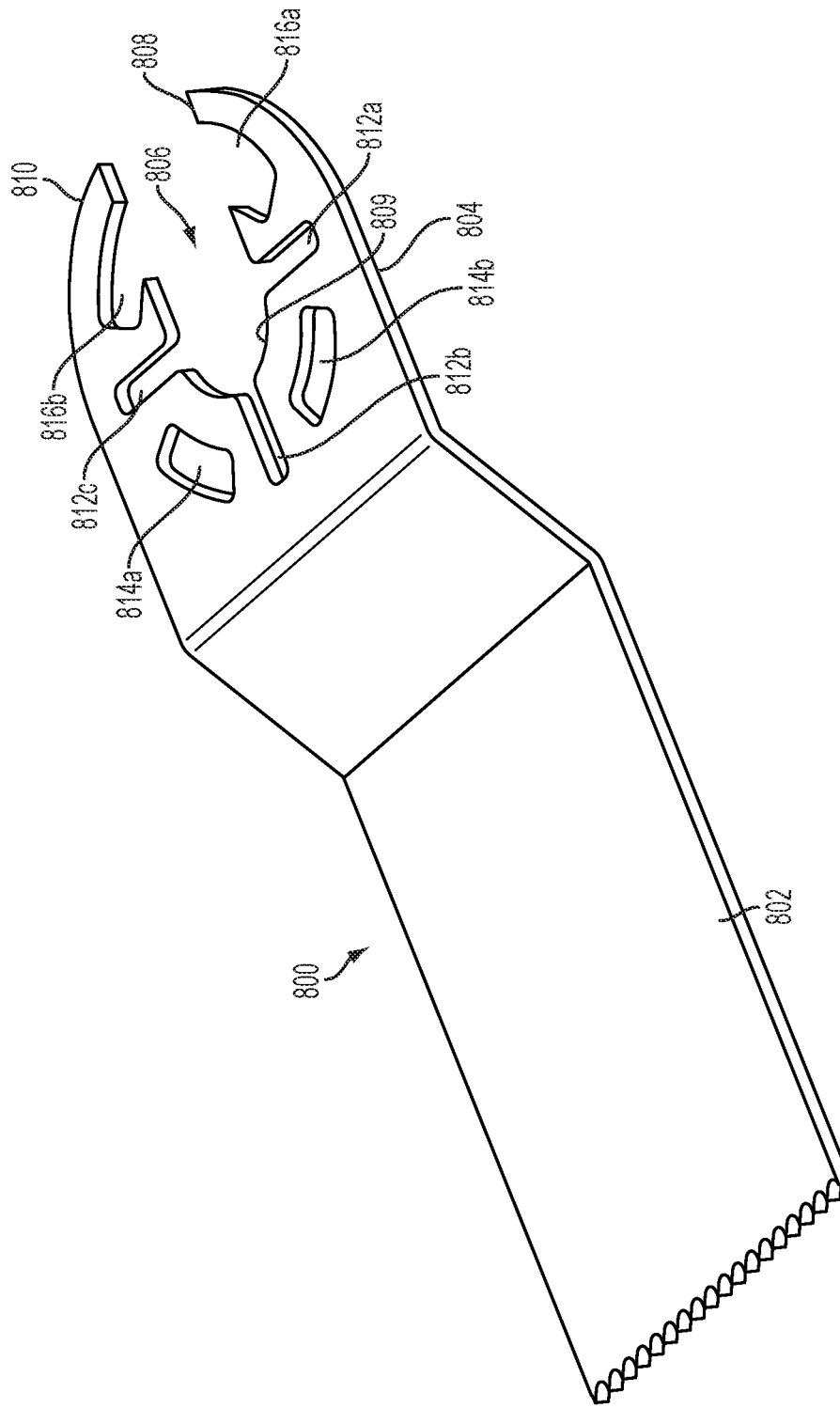
Figure 5A:
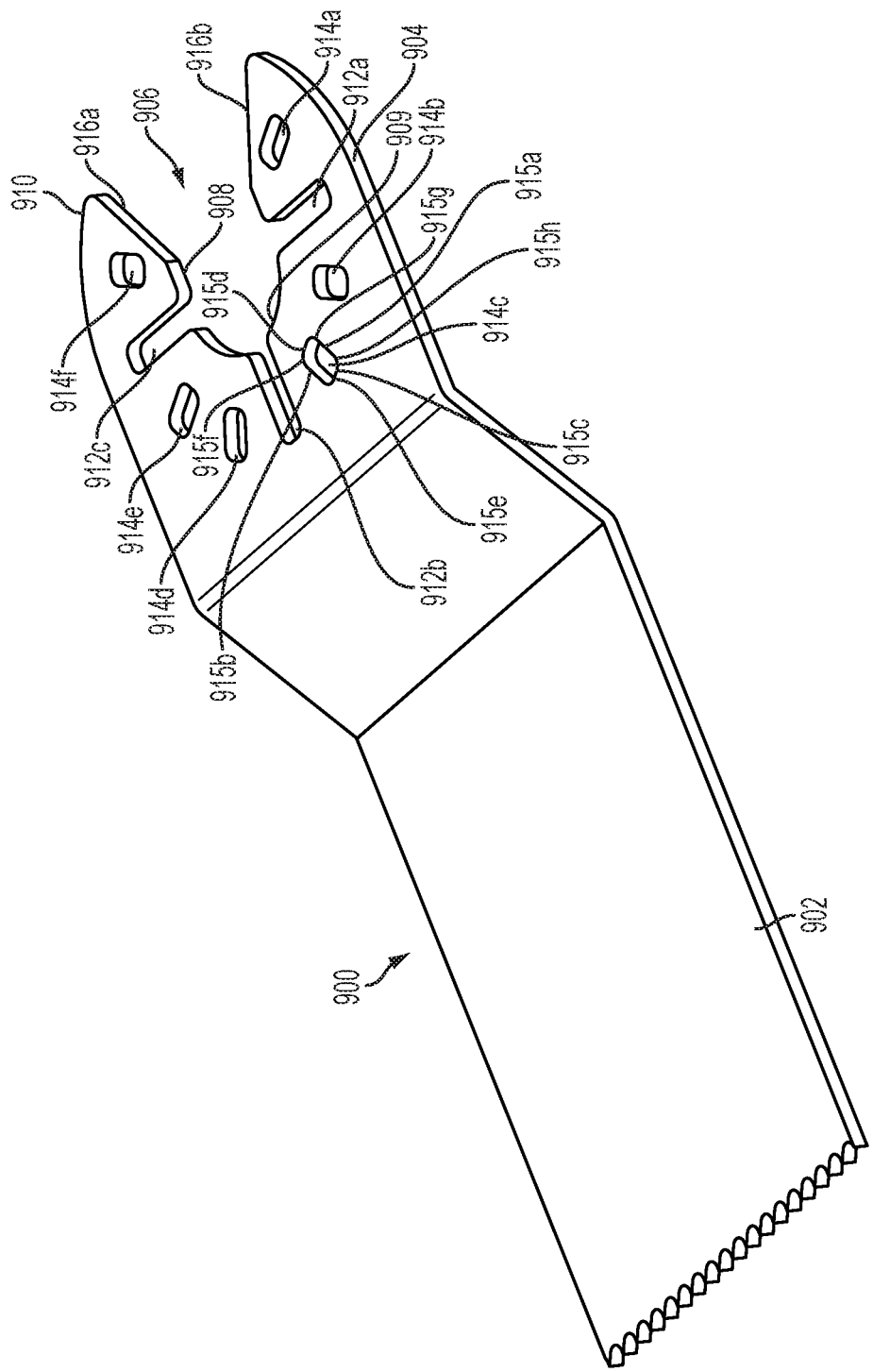
Figure 6A:
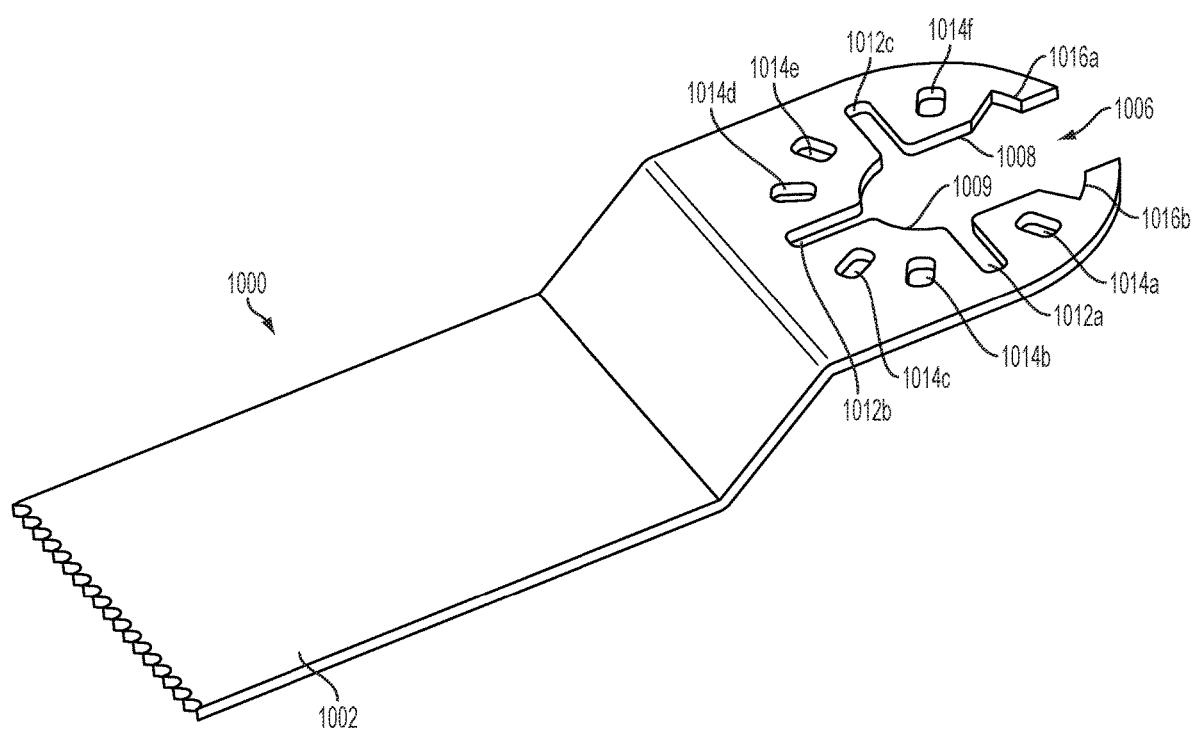

Referring to FIGS. 1C and 1D, a second embodiment of an oscillating power tool 212 includes a second type of accessory attachment mechanism 50 that requires the use of a separate tool such as a screwdriver or wrench to couple a blade to the oscillating power tool. Such an exemplary accessory attachment mechanism 50 includes a clamping face 51 that is fixedly attached to the spindle to oscillate with the spindle, and a threaded bolt 52 that can be removably received (using a separate tool) in a threaded bore 54 in the spindle and/or in the clamping face 51. The accessory attachment mechanism 50 may optionally include a washer 56 received between the head of the bolt 52 and the clamping face 51. The clamping face 51 includes a plurality of mounting features in the form of projections 53 configured to engage with a plurality of recesses or openings 57 in an oscillating blade or accessory 58. To couple an oscillating blade 58 to the oscillating power tool, the bolt 52 and washer 56 are removed from the threaded bore 54, the oscillating blade 58 has its recesses or openings 57 aligned with the projections 53 on the clamping face 51, and the bolt 52 and washer 56 are reattached to the threaded bore 54 to hold the oscillating blade 58 between the bolt 52 and the clamping face 51. The oscillating blade 58 can be removed by removing the bolt 52 and/or washer 56 from the threaded bore 54.

Referring to FIGS. 2A-2F, a common feature of the disclosed accessory attachment mechanisms for oscillating tools (both the tool and tool-free types) is that they have mounting features in the form of a plurality of projections. However, different manufacturers and brands of oscillating power tools have mounting features with different patterns of projections for engaging different patterns openings in an accessory or cutting blade. In one aspect, this application discloses several embodiments of oscillating accessories that are universally adaptable to be coupled to the accessory attachment mechanisms on these different types of mounting features.

For example, FIG. 2A illustrates a projection pattern 100 on Porter-Cable® branded oscillating power tools (e.g., the Porter-Cable® PC250MTK oscillating power tool), which includes eight round projections 100a-100h arranged clockwise about a support post 102 for the clamping mechanism at angles of 0, 60, 90, 120, 180, 240, 270, and 300 degrees, respectively, relative to an imaginary vertical line 104 extending from the central hole 102 through the projection 100a. FIG. 2B illustrates a projection pattern 200 on Mastercraft® branded oscillating power tools (e.g., the Mastercraft® 054-1266-4 oscillating tool), which includes four round projections 200a-200d arranged clockwise about a central circular projection 202 at angles of 0, 90, 180, and 270 degrees, respectively, relative to an imaginary vertical line 204 extending from the central projection 202 through the projection 200a. FIG. 2C illustrates a projection pattern 300 on Dremel®, Bosch®, Milwaukee®, and Skil® branded oscillating power tools (e.g., the Dremel® Multi-Max MM-20 oscillating tool, the Bosch® MX25EC-21 Multi-X oscillating tool, the Milwaukee® 2426-22 oscillating tool, and the Skil® 1400-02 oscillating tool) which includes twelve oblong projections 300a-300l arranged clockwise about a central point 302 at angles of 0, 30, 60, 90, 120, 150, 180, 210, 240, 270, 300, and 330 degrees, respectively, relative to an imaginary vertical line 204 extending from the central point 302 through the projection 300a.

FIG. 2D illustrates a projection pattern 400 on Fein® branded oscillating power tools (e.g., the Fein® FMM-250 oscillating tool), which includes a central, circular projection 402, and four radial projections 400a-400d extending radially outward from the central projection 402 clockwise at angles of 0, 90, 180, and 270 degrees, respectively, relative to an imaginary vertical line 404 extending from the central projection 402 through the radial projection 400a. FIG. 2E illustrates a projection pattern 500 on Craftsman® branded oscillating power tools (e.g., the Craftsman® 2702 oscillating tool), which includes a four radial projections 500a-500d extending radially outward, and arranged clockwise about a central point 502 at angles of 0, 90, 180, and 270 degrees, respectively, relative to an imaginary vertical line 504 extending from the central point 502 through the radial projection 500a. FIG. 2F illustrates a projection pattern 600 on Ridgid® branded oscillating power tools (e.g., the Ridgid® R26800 oscillating tool), which includes a central, circular projection 602, and four radial projections 600a-

600d extending radially outward from the central projection 602 clockwise at angles of 0, 90, 180, and 270 degrees, respectively, relative to an imaginary vertical line 604 extending from the central projection 602 through the radial projection 600a.

Referring to FIGS. 3A-3H, a first embodiment of an oscillating accessory 700 includes a working end 702 and a rear end 704. The rear end 704 has a fitment portion having a plurality of openings 706 configured to couple the accessory 700 to each of the projection patterns illustrated in FIGS. 2A-2F. The openings 706 include a generally U-shaped opening 708 extending from a rear end portion 710 of the accessory 700 and terminating in a generally circular (mostly semi-circular) central portion 709 of the opening 708. Three radial arm openings 712a-712c are in communication with and extend radially outward from the central portion 709. The radial arm openings 712a-712c are positioned at 90, 180, and 270 degree angles relative to the U-shaped opening. A pair of arc-shaped openings 714a, 714b are not in communication with the central portion 709, and are disposed between the first and second radial openings 712a, 712b, and the second and third radial openings 712b, 712c, respectively. The arc-shaped opening 714a subtends an arc of approximately 120 degrees to approximately 150 degrees relative to the U-shaped opening. The arc-shaped opening 714b subtends an arc of approximately 210 degrees to approximately 240 degrees relative to the U-shaped opening. The rear end portion 710 includes a third plurality of openings in the form of a pair of notches 716a, 716b that extend circumferentially from the U-shaped opening 708, and that are spaced radially outward from the central portion 709.

The U-shaped opening 708 is opened at the rear end portion 710 in order to be able to receive the support post 102 of the Porter-Cable® branded power tool. The central portion 709 is configured to receive the central projections 202, 402, and 602 of the Fein®, Ridgid®, and Mastercraft® branded power tools, respectively. The radial openings 712a-712c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The arc-shaped openings 714a, 714b are configured to receive the round projections 100d, 100f of the Porter-Cable® branded power tools, and the oblong projections 300e, 300f, 300h, 300i of the Dremel®, Bosch®, Milwaukee®, and Skil® branded power tools. The notches 716a, 716b are configured to receive the round projections 100b, 100h of the Porter-Cable® branded power tools, and the oblong projections 300c, 300k of the Dremel®, Bosch®, Milwaukee®, and Skil® branded power tools. In this manner, the openings 700 can universally engage the attachment mechanism of any of the aforementioned oscillating power tools.

Referring to FIGS. 4A-4H, a second embodiment of an oscillating accessory 800 includes a working end 802 and a rear end 804. The rear end 804 has a fitment with a plurality of openings 806 configured to couple the accessory 800 to each of the projection patterns illustrated in FIGS. 2A-2F. The openings 806 include a generally U-shaped opening 808 extending from a rear end portion 810 of the accessory 800 and terminating in a generally circular central portion 809. Three radial arm openings 812a-812c are in communication with and extend radially outward from the central portion 809. The radial arm openings 812a-812c are positioned at angles of approximately 90 degrees, 180 degrees, and 270 degree relative to the U-shaped opening. A first pair of arc-shaped openings 814a, 814b are not in communication with and spaced radially outward from the central portion 809. The arc-shaped openings 814a, 814b are disposed between the first and second radial openings 812a, 812b, and the second and third radial openings 812b, 812c, respectively. The arc-shaped opening 814a subtends an arc of approximately 120 degrees to approximately 150 degrees relative to the U-shaped opening. The arc-shaped opening 814b subtends an arc of approximately 210 degrees to approximately 240 degrees relative to the U-shaped opening. A second pair of semi-arc-shaped openings 816a, 816b extend circumferentially from the U-shaped opening 808 and are spaced from the first and third radial openings 812c, 812a, and are spaced radially outward from the central portion 809. The radial openings 816a, 816b subtend an angle of approximately 30 degrees to approximately 60 degrees and an angle of approximately 300 degrees to approximately 330 degrees, relative to the, respectively, relative to the U-shaped opening 808.

The U-shaped opening 808 is opened at the rear end portion 810 in order to be able to receive the support post 102 of the Porter-Cable® branded power tool. The central portion 809 is configured to receive the central projections 202, 402, and 602 of the Fein®, Ridgid®, and Mastercraft® branded power tools, respectively. The radial openings 812a-812c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The first set of arc-shaped openings 814a, 814b are configured to receive the round projections 100d, 100f of the Porter-Cable® branded power tools, and the oblong projections 300e, 300f, 300h, 300i of the Dremel®, Bosch®, Milwaukee®, and Skil® branded power tools. The second set of arc-shaped openings 816a, 816b are configured to receive the round projections 100b, 100h of the Porter-Cable® branded power tools, and the oblong projections 300c, 300k of the Dremel®, Bosch®, Milwaukee®, and Skil® branded power tools. In this manner, the openings 800 can universally engage the attachment mechanism of any of the aforementioned oscillating power tools.

Referring to FIGS. 5A-5H, a third embodiment of an oscillating accessory 900 includes a working end 902 and a rear end 904. The rear end 904 has a fitment with a plurality of openings 906 configured to couple the accessory 900 to each of the projection patterns illustrated in FIGS. 2A-2F. The openings 906 include a generally U-shaped opening 908 extending from a rear end portion 910 of the accessory 900 and terminating in a generally circular central portion 909. A first set of three radial arm openings 912a-912c are in communication with and extend radially outward from the central portion 908 at approximately 90 degrees, 180 degrees, and 270 degrees, respectively, relative to the U-shaped opening 909. A second set of six radial openings 914a-914e are spaced radially outward from and not in communication with the central portion 909, and are positioned at approximately 60 degrees, 120 degrees, 150 degrees, 210 degrees, 240 degrees, and 300 degrees relative to the U-shaped openings. Each of the radial openings 914a-914e has a substantially rectangular shape defined by a pair of substantially straight, elongated sidewalls 915a, 915b extending substantially parallel to a radial direction, a pair of substantially straight end walls 915c, 915d extending substantially perpendicular to the radial direction, and four rounded corners 915e, 915f, 915g, 915h, each joining an adjacent sidewall and end wall. In addition, a pair of chamfers 916a, 916b taper outward from the U-shaped opening 908 to the rear end portion 910 of the accessory 900.

The U-shaped opening 908 is opened at the rear end portion 910 in order to be able to receive the support post 102 of the Porter-Cable® branded power tool. The central portion 909 is also configured to receive the central projections 202, 402, and 602 of the Fein®, Ridgid®, and Mastercraft® branded power tools, respectively. The first set of radial openings 912a-912c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The second set of radial openings 914a-914e are configured to receive the round projections 100b, 100d, 100f, 100h of the Porter-Cable® branded power tools, and the oblong projections 300c, 300e, 300f, 300h, 300i, 300k of the Dremel®, Bosch®, Milwaukee®, and Skil® branded power tools. The chamfers 916a, 916b are configured to receive and provide clearance for the oblong projections 300b, 300l of the Dremel®, Bosch®, Milwaukee®, and Skil® branded power tools. In this manner, the openings 900 can universally engage the attachment mechanism of any of the aforementioned oscillating power tools.

Referring to FIG. 6A-6H, a fourth embodiment of an oscillating accessory 1000 includes a working end 1002 and a rear end 1004. The rear end 1004 has a fitment with a plurality of openings 1006 configured to couple the accessory 1000 to each of the projection patterns illustrated in FIGS. 2A-2F. The openings 1006 include a generally U-shaped opening 1008 extending from a rear end portion 1010 of the accessory 1000 and terminating in a generally circular central portion 1009. A first set of three radial arm openings 1012a-1012c are in communication with and extend radially outward from the central portion 1009 at angles of approximately 90 degrees, 180 degrees, and 270 degrees relative to the U-shaped opening. A second set of six radial openings 1014a-1014e are spaced radially outward from and not in communication with the central portion 1009 at angles of approximately 60 degrees, 120 degrees, 150 degrees, 210 degrees, 240 degrees, and 300 degrees relative to the U-shaped opening. In addition, a pair of circumferentially extending notches 1016a, 1016b are in communication with the U-shaped opening 1008, and spaced from the central portion 1009. The notches 1016a, 1016b are positioned at angles of approximately 30 degrees and approximately 330 degrees relative to the U-shaped opening 1008.

The U-shaped opening 1008 is opened at the rear end portion 1010 in order to be able to receive the support post 102 of the Porter-Cable® branded power tool. The U-shaped opening 1008 is also configured to receive the central projections 202, 402, and 602 of the Fein®, Ridgid®, and Mastercraft® branded power tools, respectively. The first set of radial openings 1012a-1012c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The second set of radial openings 1014a-1014e are configured to receive the round projections 100b, 100d, 100f, 100h of the Porter-Cable® branded power tools, and the oblong projections 300c, 300e, 300f, 300h, 300i, 300k of the Dremel®, Bosch®, Milwaukee®, and Skil® branded power tools. The notches 1016a, 1016b are configured to receive the oblong projections 300b, 300l of the Dremel®, Bosch®, Milwaukee®, and Skil® branded power tools. In this manner, the openings 1000 can universally engage the attachment mechanism of any of the aforementioned oscillating power tools.

Figure 7A:
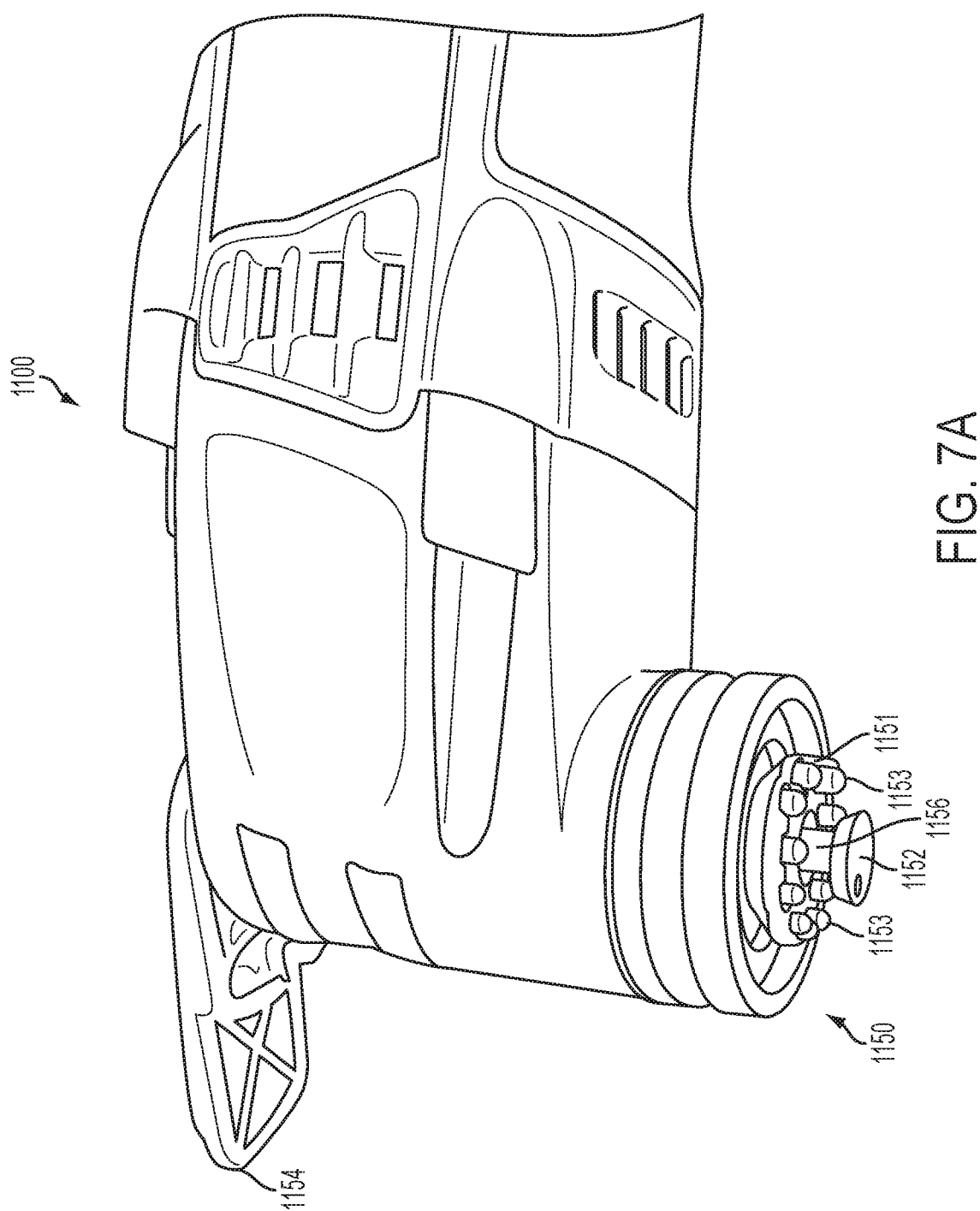

Referring to FIGS. 7A-9C, an adapter may enhance the attachment of aforementioned oscillating accessories 700, 800, 900, or 1000 to some embodiments of oscillating power tools. Referring to FIGS. 7A and 7B, an example a third embodiment of an oscillating power tool is a Dremel® MM40 Multi-Max oscillating power tool 1100. The power tool 1100 has an accessory attachment mechanism 1150 with a clamping face 1151 that is fixedly attached to the spindle to oscillate with the spindle. The clamping face 1151 includes a plurality of mounting features in the form of projections 1153 configured to engage with a plurality of recesses or openings in an oscillating blade or accessory. The projections 1153 having the same configuration as the projections 300 on the Dremel® oscillating power tool shown in FIG. 2C. However, instead of a removable threaded bolt, the power tool 1100 includes an axially moveable clamping flange 1152 that is connected to a lever 1154 via a central rod 1156 received through the center of the clamping face 1151. Actuating the lever 1154 moves the clamping flange 1152 axially between an open or unclamped position (FIG. 7A) and a closed or clamped position (FIG. 7B) for clamping a saw blade between the flange 1152 and the clamping face 1153.

Figure 8A:
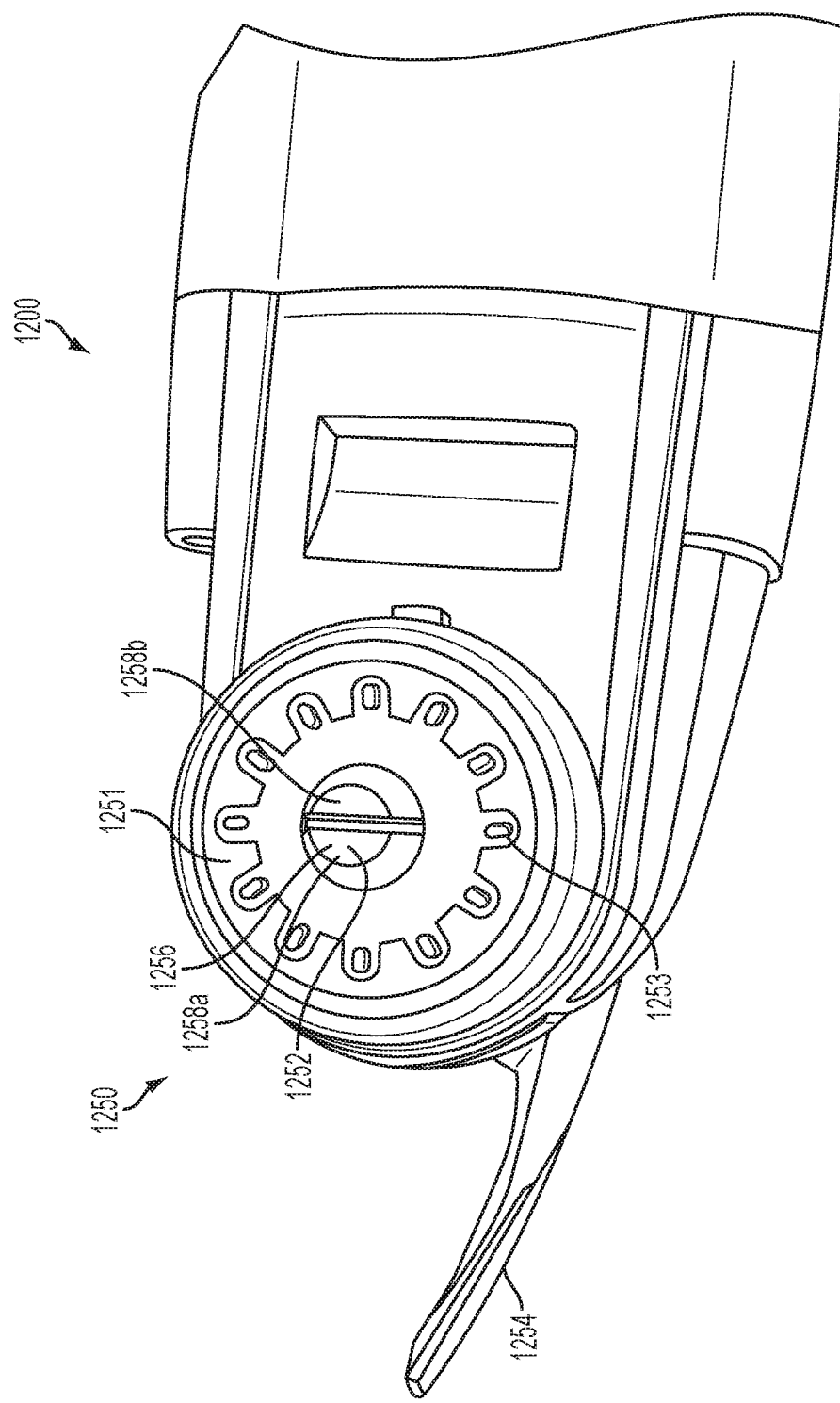
FIGS. 8A-8B are perspective views of a fourth embodiment of an oscillating power tool.
Figure 8B:
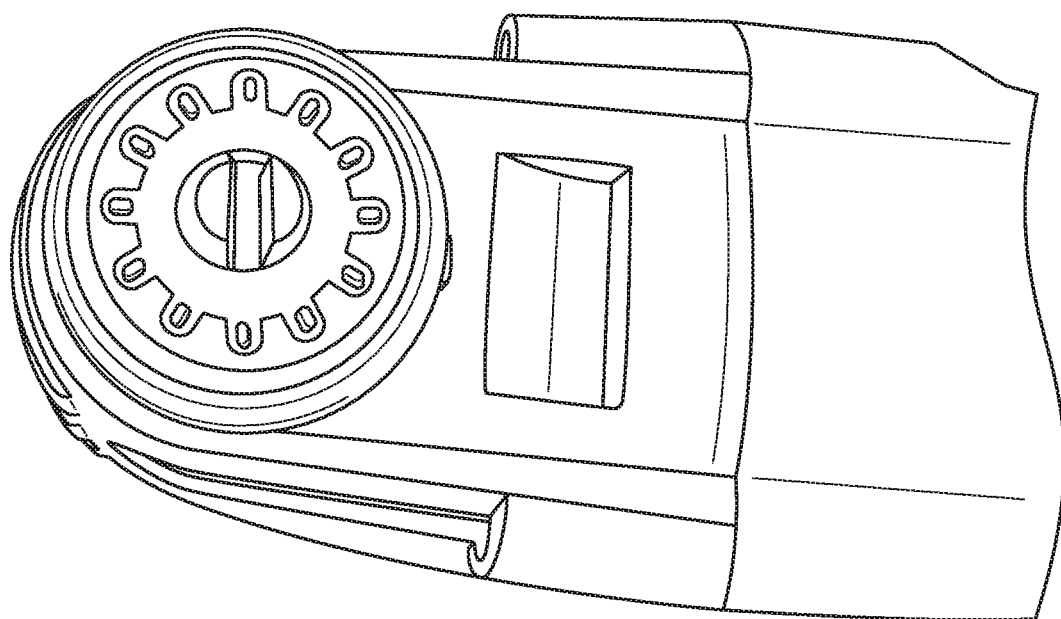

Referring to FIGS. 8A and 8B, an example of a fourth embodiment of an oscillating power tool is a Bosch® MX30E Multi-X oscillating power tool 1200. The power tool 1200 has an accessory attachment mechanism 1250 with a clamping face 1251 that is fixedly attached to the spindle to oscillate with the spindle. The clamping face 1251 includes a plurality of mounting features in the form of projections 1253 configured to engage with a plurality of recesses or openings in an oscillating blade or accessory. The projections 1253 having the same configuration as the projections 300 on the Bosch® oscillating power tool shown in FIG. 2C. However, instead of a removable threaded bolt, the power tool 1200 includes a radially expandable clamping post 1252 that is connected to a lever 1254 via a central rod received through the center of the clamping face 1251. The clamping post 1252 has an enlarged end portion 1256 with a pair of semi-circular flanges 1258a, 1258b separated by a space. Actuating the lever 1254 moves the clamping flanges 1258a, 1258b between a an open or unclamped position where the flanges 1258a, 1258b are relatively close to one another (FIG. 8A) to enable insertion of a saw blade, and a closed or clamped position where the flanges 1258a, 1258b are radially further apart (FIG. 8B) for clamping a saw blade between the flange 1258a, 1258b and the clamping face 1253.

Figure 9A:
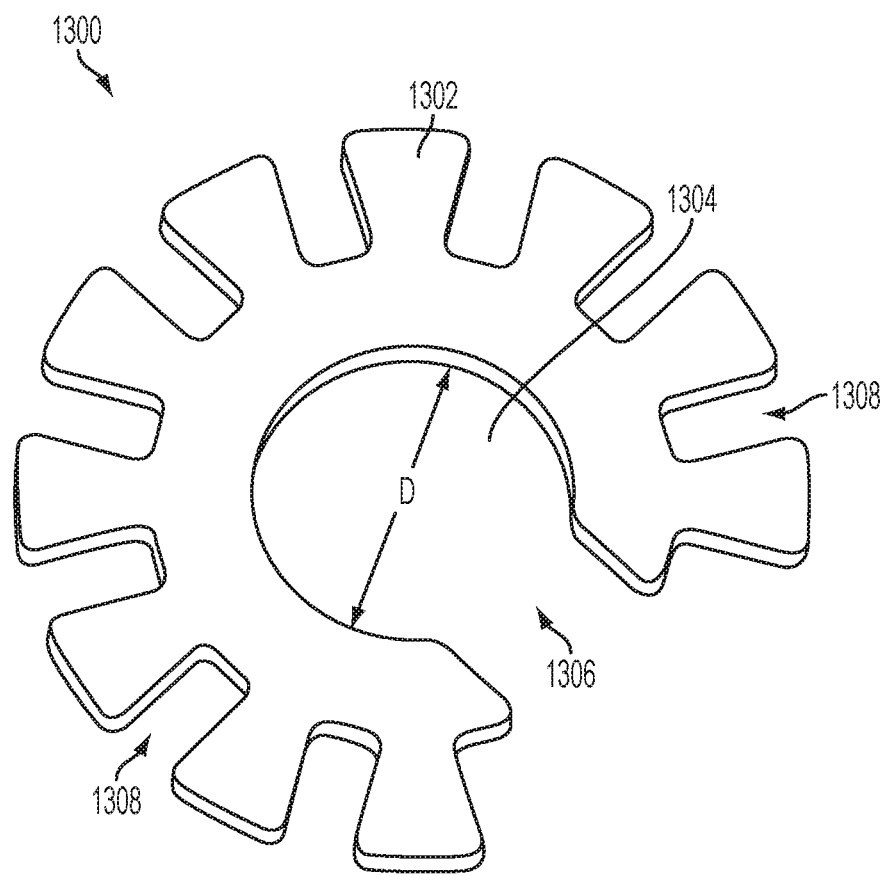
FIG. 9A is a perspective view of an adapter for use with the oscillating accessories of FIGS. 2A-6H.

Referring to FIG. 9A, an adapter 1300 may enhance the ability of the oscillating accessories 700, 800, 900, and 1000 to be coupled to the attachment mechanisms 1150, 1250, or the attachment mechanisms of other oscillating power tools. The adapter includes a generally flat disc-like body 1302 having a generally circular or partially circular shape. The body 1302 includes a generally U-shaped opening with a central portion 1304. A radial opening 1306 extends from the central portion 1304 to the periphery of the body 1302. The central portion has an inner diameter D that is less than an inner diameter of the central portions 709, 809, 909, 1009 in the accessories 700, 800, 900, 1000. The adapter 1300 may further include a plurality of peripheral radial slots 1308 configured to receive the plurality of projections on the clamping faces of the oscillating power tools.

Figure 9B:
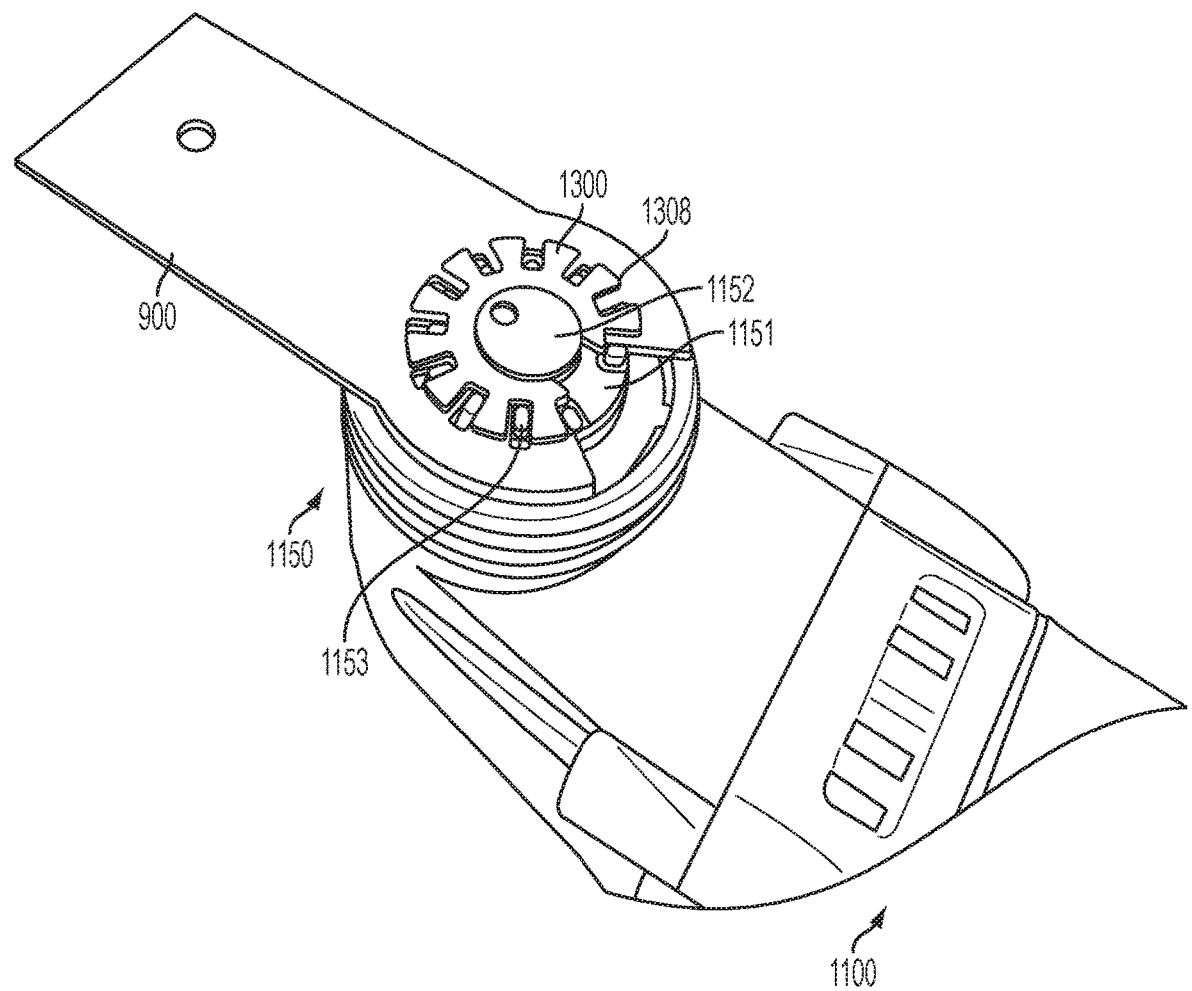
FIG. 9B is a perspective view illustrating the adapter of FIG. 9A and the accessory of FIG. 5A coupled to the oscillating power tool of FIG. 7A.

Referring to FIG. 9B, in one example, the adapter 1300 may help couple oscillating accessory 900 to the Dremel® MM40 Multi-Max oscillating power tool 1100. The adapter 1300 is received between the oscillating accessory 900 and the flange 1152 of the clamping mechanism 1150. The smaller inner diameter of the central portion 1304 of the adapter helps retain the oscillating accessory 900 on the tool 1100 by providing greater surface area for engagement by the flange 1152. Meanwhile, the projections 1153 are received in the radial openings 1308 in the adapter 1300 to prevent rotation of the adapter 1300 and accessory 900 relative to the clamping mechanism 1150. Thus, the adapter 1300 helps retain the accessory 900 on the power tool 1100.

Figure 9C:
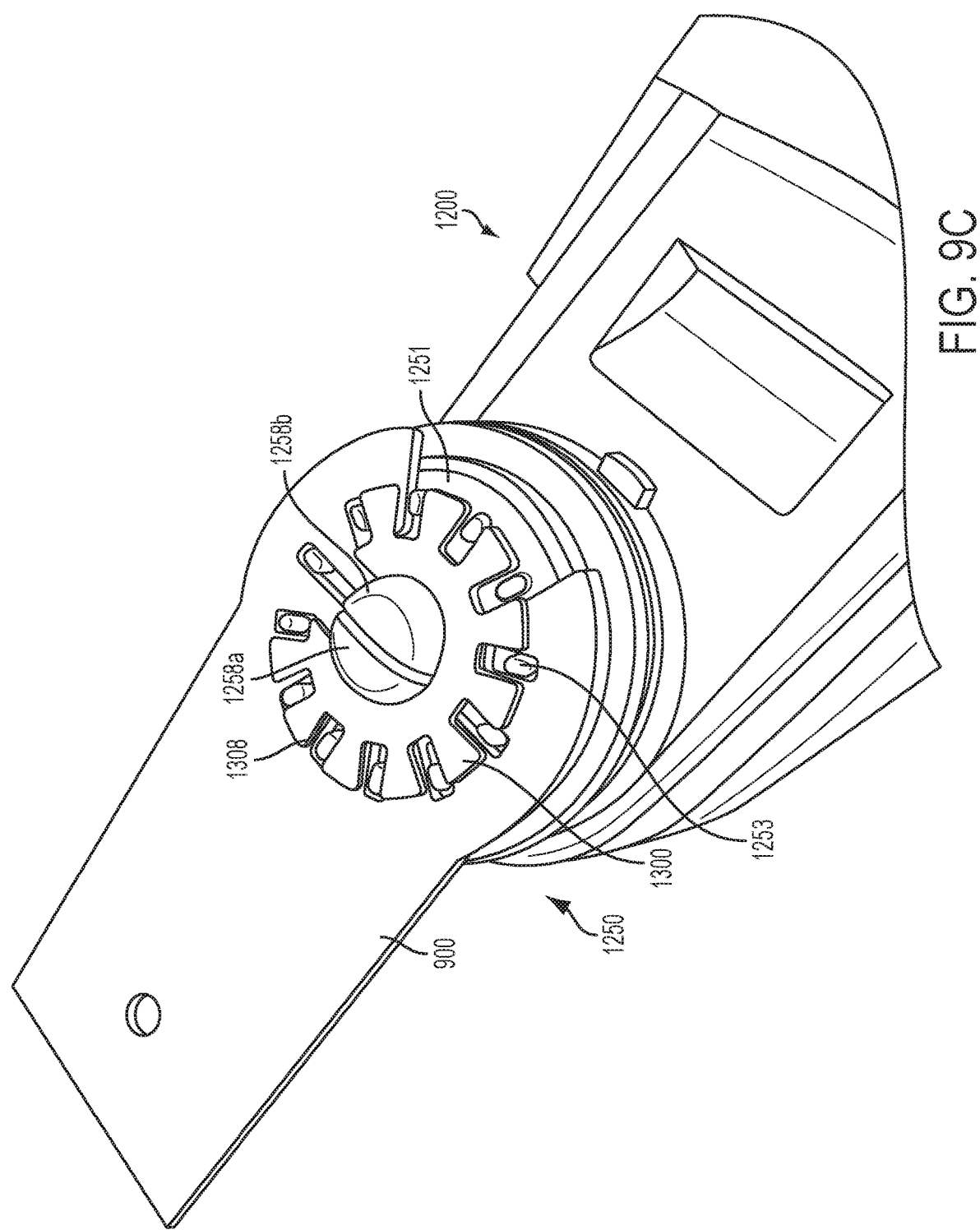
FIG. 9C is a perspective view illustrating the adapter of FIG. 9A and the accessory of FIG. 5A coupled to the oscillating power tool of FIG. 8A.

Referring to FIG. 9C, in another example, the adapter 1300 may help couple the oscillating accessory 900 to the Bosch® MX30E Multi-X oscillating power tool 1200. The adapter 1300 is received between the oscillating accessory 900 and the flanges 1258a, 1258b of the clamping mechanism 1250. The smaller inner diameter of the central portion 1304 of the adapter helps retain the oscillating accessory 900 on the tool 1200 by providing greater surface area for engagement by the flanges 1258a, 1258b. Meanwhile, the projections 1253 are received in the radial openings 1308 in the adapter 1300 to prevent rotation of the adapter 1300 and accessory 900 relative to the clamping mechanism 1150. Thus, the adapter 1300 helps retain the accessory 900 on the power tool 1100. It should be understood that this or a similar adapter may be used to help retain any of the accessories 700, 800, 900, 1000 on any of the oscillating power tool attachment mechanisms discussed in this application, whether tool-free or not.

Numerous modifications may be made to the exemplary implementations described above. For example, the shapes and configurations of the openings in the oscillating accessories and/or the adapter could be modified, or the openings could be made as recesses. The oscillating accessory may be any type of accessory used with oscillating tool such as a cutting tool, a saw blade, or a sanding or abrading tool. These and other implementations are within the scope of this application.

What is claimed is:

1. A combination kit comprising: a first oscillating power tool comprising a housing, a motor disposed in the housing, a transmission configured to convert a rotational motion of the motor to an oscillating motion of an output member, and a first accessory attachment mechanism coupled to the output member and having a first central member and a plurality of first circumferential projections spaced radially from the first central member and circumferentially spaced around the first central member; and an accessory comprising a working end portion and an opposite rear end portion configured to be removably coupled to the attachment mechanism, the rear end portion including: (a) a generally central opening open to the rear end portion, the central opening having a central portion and a rearward portion in communication with the central portion and open to the rear end portion of the accessory; (b) a first plurality of openings in communication with and extending radially outward from the central opening, the first plurality of openings including a first radial arm slot extending from the central portion, a second radial arm slot extending from the central portion at approximately 90 degrees to the first radial arm slot, and a third radial arm slot extending from the central portion at approximately 180 degrees to the first radial arm slot; (c) a second plurality of openings not in communication with and positioned radially outward from the central opening, and (d) a pair of notches defined along a pair of opposed edges in the central opening, wherein the central portion is configured to receive the first central member, at least one of the radial arm slots is configured to receive at least a first of the plurality of first circumferential projections, and at least one of the second plurality of openings is configured to receive at least a second of the plurality of first circumferential projections when the accessory is coupled to the first accessory attachment mechanism of the first oscillating power tool, and wherein the rear end portion is configured to be coupled to a second accessory attachment mechanism of a second oscillating power tool, the second accessory attachment mechanism including a second central member configured to be received in the central opening and a plurality of radial arm projections extending radially from the central member and configured to be received in at least one the radial arm slots when the accessory is coupled to the second accessory attachment mechanism of the second oscillating power tool.

2. The kit of claim 1, wherein the first accessory attachment mechanism comprises a first clamping face that carries the first circumferential projections.

3. The kit of claim 1, wherein the first central member comprises a central post that extends through the first clamping face.

4. The kit of claim 3, wherein the first central member comprises a first central projection on the first clamping face.

5. The kit of claim 1, wherein the first circumferential projections comprise at least eight circumferential projections arranged circumferentially about the first central member at angles of 0, 60, 90, 120, 180, 240, 270, and 300 degrees relative to a line extending through the first central member and one of the first circumferential projections.

6. The kit of claim 1, wherein the central opening comprises a generally U-shaped opening.

7. The kit of claim 6, wherein the oscillating accessory includes a pair of chamfers tapering outward from the U-shaped opening to the rear end portion.

8. The kit of claim 7, further comprising a notch defined between each chamfer and the generally U-shaped opening.

9. The kit of claim 1, wherein the second plurality of openings includes a first pair of radial openings spaced radially from the central portion and between the first and second radial arm slots, and a second pair of radial openings spaced radially from the central portion and between the second and third radial arm slots.

10. The kit of claim 9, wherein the first pair of radial openings comprise a first radial opening positioned approximately 30 degrees from the first radial arm slot and a second radial opening positioned approximately 30 degrees from the second radial arm slot, and the second pair of radial openings comprise a third radial opening positioned approximately 30 degrees from the second radial arm slot and a fourth radial opening positioned approximately 30 degrees from the third radial arm slot.

11. A combination kit comprising: a first oscillating power tool comprising a housing, a motor disposed in the housing, a transmission configured to convert a rotational motion of the motor to an oscillating motion of an output member, and a first accessory attachment mechanism coupled to the output member and having a first central member and a plurality of radial arm projections extending radially from the first central member; and an accessory comprising a working end portion and an opposite rear end portion configured to be removably coupled to the attachment mechanism, the rear end portion including: (a) a generally central opening open to the rear end portion, the central opening having a central portion and a rearward portion in communication with the central portion and open to the rear end portion of the accessory; (b) a first plurality of openings in communication with and extending radially outward from the central opening, the first plurality of openings including a first radial arm slot extending from the central portion, a second radial arm slot extending from the central portion at approximately 90 degrees to the first radial arm slot, and a third radial arm slot extending from the central portion at approximately 180 degrees to the first radial arm slot; (c) a second plurality of openings not in communication with and positioned radially outward from the central opening, and (d) a pair of notches defined along a pair of opposed edges in the central opening, wherein the central opening is configured to receive the first central member and at least one of the radial arm slots is configured to receive the at least one of the radial arm projections when the accessory is coupled to the first accessory attachment mechanism of the first oscillating power tool, and wherein the rear end portion is configured to be coupled to a second accessory attachment mechanism of a second oscillating power tool, the second accessory attachment mechanism including a second central member configured to be received in the central opening and a plurality of second projections spaced radially from the second central member and circumferentially spaced around the second central member with at least one of the radial arm slots receiving at least a first of the plurality of second projections, and at least one of the second plurality of openings receiving at least a second of the plurality of second projections when the accessory is coupled to the second accessory attachment mechanism of the second oscillating power tool.

12. The kit of claim 11, wherein the first accessory attachment mechanism comprises a first clamping face that carries the at least one radial projection.

13. The kit of claim 12, wherein the first central member comprises a central post that extends through the first clamping face.

14. The kit of claim 13, wherein the first central member comprises a first central projection on the first clamping face.

15. The kit of claim 11, wherein the plurality of radial arm projections comprises a first radial arm projection and a second radial arm projection positioned at approximately 180 degrees to the first radial arm projection.

16. The kit of claim 11, wherein the central opening comprises a generally U-shaped opening.

17. The kit of claim 16, wherein the oscillating accessory includes a pair of chamfers tapering outward from the U-shaped opening to the rear end portion.

18. The kit of claim 17, further comprising a notch defined between each chamfer and the generally U-shaped opening.

19. The kit of claim 11, wherein the second plurality of openings includes a first pair of radial openings spaced radially from the central portion and between the first and second radial arm slots, and a second pair of radial openings spaced radially from the central portion and between the second and third radial arm slots.

20. The kit of claim 11, wherein the first pair of radial openings comprise a first radial opening positioned approximately 30 degrees from the first radial arm slot and a second radial opening positioned approximately 30 degrees from the second radial arm slot, and the second pair of radial openings comprise a third radial opening positioned approximately 30 degrees from the second radial arm slot and a fourth radial opening positioned approximately 30 degrees from the third radial arm slot.

* * * * *